United States Patent
Levinson et al.

(10) Patent No.: US 9,154,740 B2
(45) Date of Patent: Oct. 6, 2015

(54) SYSTEM AND METHOD FOR REAL TIME VIDEO STREAMING FROM A MOBILE DEVICE OR OTHER SOURCES THROUGH A SERVER TO A DESIGNATED GROUP AND TO ENABLE RESPONSES FROM THOSE RECIPIENTS

(75) Inventors: Lawrence Levinson, Roslyn, NY (US); Deepinder Singh, East Windsor, NY (US)

(73) Assignee: ZAP GROUP LLC, Cranbury, NJ (US)

( * ) Notice: Subject to any disclaimer, the term of this patent is extended or adjusted under 35 U.S.C. 154(b) by 350 days.

(21) Appl. No.: 13/451,200

(22) Filed: Apr. 19, 2012

(65) Prior Publication Data

US 2013/0007788 A1  Jan. 3, 2013

Related U.S. Application Data

(60) Provisional application No. 61/502,724, filed on Jun. 29, 2011.

(51) Int. Cl.
*H04N 7/173*  (2011.01)
*H04N 7/18*  (2006.01)

(52) U.S. Cl.
CPC ..................................... *H04N 7/18* (2013.01)

(58) Field of Classification Search
None
See application file for complete search history.

(56) References Cited

U.S. PATENT DOCUMENTS

| 5,648,770 | A | 7/1997 | Ross |
| 5,982,420 | A | 11/1999 | Ratz |
| 7,308,246 | B2 | 12/2007 | Yamazaki et al. |
| 7,444,588 | B2 * | 10/2008 | Hill et al. ................... 715/255 |
| 7,451,401 | B2 | 11/2008 | Tanskanen et al. |
| 7,508,941 | B1 | 3/2009 | O'Toole, Jr. et al. |

(Continued)

FOREIGN PATENT DOCUMENTS

| RU | 2 018 867 C1 | 8/1994 |
| RU | 2 196 358 C2 | 1/2003 |
| RU | 36 315 U1 | 3/2004 |

OTHER PUBLICATIONS

International Search Report together with the Written Opinion dated Sep. 20, 2012 from related application PCT/US 2012/042599.

(Continued)

*Primary Examiner* — Nasser Goodarzi
*Assistant Examiner* — Fred Peng
(74) *Attorney, Agent, or Firm* — Scully, Scott, Murphy & Presser, PC

(57) ABSTRACT

A system and method for real time video streaming from a device through a website to a designated group for security, personal, entertainment or commercial applications and to enable responses from those recipients comprises a server operable to bi-directionally communicate with the device and other devices, which are operable to bi-directionally communicate with the server and a module on the server operable to receive notice of an upstream from the device and authenticate a log-in of the device, e.g., a user, transmit content of the upstream to the website, transmit the notice of the upstream to either Designated Recipient Groups or pre-determined recipients, display the content of the upstream on the website, in response to requests, enable placement of information such as advertising and publicity in the content, and enable responses to the content, such as communicating with the user, posting comments, conducting electronic commerce, making appointments and making reservations.

36 Claims, 21 Drawing Sheets

(56) References Cited

U.S. PATENT DOCUMENTS

| | | |
|---|---|---|
| 7,843,491 B2 | 11/2010 | Vallone et al. |
| 7,956,723 B2 | 6/2011 | Girgis et al. |
| 8,149,109 B2 | 4/2012 | Lontka |
| 2003/0098869 A1 | 5/2003 | Arnold et al. |
| 2003/0169185 A1 | 9/2003 | Taylor |
| 2005/0097135 A1 | 5/2005 | Epperson et al. |
| 2006/0000971 A1 | 1/2006 | Jones et al. |
| 2006/0276200 A1 | 12/2006 | Radhakrishnan et al. |
| 2008/0031426 A1 | 2/2008 | Weeks |
| 2008/0216139 A1* | 9/2008 | Liwerant et al. ............... 725/113 |
| 2008/0304628 A1 | 12/2008 | Rowe et al. |
| 2008/0320538 A1* | 12/2008 | Liwerant ................ 725/118 |
| 2009/0044237 A1* | 2/2009 | Keiter ................ 725/91 |
| 2009/0150947 A1* | 6/2009 | Soderstrom ................ 725/93 |
| 2009/0284348 A1 | 11/2009 | Pfeffer |
| 2009/0300498 A1 | 12/2009 | Falchuk |
| 2009/0300530 A1 | 12/2009 | Falchuk |
| 2010/0099461 A1 | 4/2010 | Rahfaldt et al. |
| 2010/0229121 A1 | 9/2010 | Falchuk |
| 2010/0279649 A1 | 11/2010 | Thomas |
| 2011/0090334 A1 | 4/2011 | Hicks, III et al. |
| 2011/0099372 A1* | 4/2011 | Annapureddy et al. ...... 713/168 |
| 2011/0107220 A1 | 5/2011 | Perlman |
| 2011/0111728 A1 | 5/2011 | Ferguson et al. |
| 2011/0130112 A1 | 6/2011 | Saigh et al. |
| 2011/0230161 A1 | 9/2011 | Newman |
| 2012/0016952 A1* | 1/2012 | Watt ................ 709/217 |
| 2012/0052837 A1 | 3/2012 | Reich et al. |

OTHER PUBLICATIONS

United States Office Action dated Jun. 29, 2012 from related U.S. Appl. No. 13/451,089.
United States Office Action dated Jul. 25, 2012 from related U.S. Appl. No. 13/451,162.
United States Office Action dated Dec. 4, 2012 from related U.S. Appl. No. 13/451,089.
United States Office Action dated Nov. 21, 2012 from related U.S. Appl. No. 13/451,162.
International Search Report together with the Written Opinion dated Nov. 29, 2012 from related application PCT/US 2012/042595.
International Search Report together with the Written Opinion dated Oct. 18, 2012 from related application PCT/US 2012/042598.

* cited by examiner

SYSTEM AND METHOD FOR REAL TIME VIDEO STREAMING FROM A MOBILE DEVICE OR OTHER SOURCES THROUGH A SERVER TO A DESIGNATED GROUP AND TO ENABLE RESPONSES FROM THOSE RECIPIENTS

CROSS REFERENCE TO RELATED APPLICATIONS

The present invention claims the benefit of U.S. provisional patent application 61/502,724 filed Jun. 29, 2011, the entire contents and disclosure of which are incorporated herein by reference as if fully set forth herein.

This application is related to commonly-owned, co-pending U.S. patent application Ser. No. (28235) for SYSTEM AND METHOD FOR REPORTING AND TRACKING INCIDENTS WITH A MOBILE DEVICE commonly-owned, co-pending U.S. patent application Ser. No. (28236) for SYSTEM AND METHOD FOR ASSIGNING CAMERAS AND CODES TO GEOGRAPHIC LOCATIONS AND GENERATING SECURITY ALERTS USING MOBILE PHONES AND OTHER DEVICES, both filed on even date herewith, the entire contents and disclosure of which is expressly incorporated by reference herein as if fully set forth herein.

FIELD OF THE INVENTION

This invention relates generally to video streaming from mobile devices or other sources through a server to recipients in a designated group or groups and to enable responses from those recipients.

BACKGROUND OF THE INVENTION

There is a need for a system to enable spontaneous or planned real time video streaming from mobile devices or other sources, through a server, accessible to a pre-selected group of recipients, or, if preferred by the sender, accessible to the general public, and to enable responses from those recipients, such as to alert and forward the video to public safety agencies, to conduct electronic commerce or other transactions, to make reservations or appointments or to send text or data. This is different than existing systems which merely enable public access to archived video upstreamed by the general public, or transmit real time video on a one-to-one basis between users, or which merely transmit upstreamed video accessible to the general public with no control over the recipients and no capability of response by the recipients. Moreover, existing systems do not provide safety or security features.

SUMMARY OF THE INVENTION

The present invention provides a novel system whereby a sender can designate a pre-selected group of recipients who will have access on a real time basis to video imagery or video from that sender, with the recipients able to take actions in response to the video. Such a pre-selected group might be a friends and family safety group that will have real time access to video from the sender's mobile device when the sender is walking through an unsafe area so that the pre-selected group, e.g., user's safety group, can take action if warranted such as alerting and forwarding the video to the authorities, such as public safety agencies. Such a pre-selected group might be corporate customers who are given a real-time video presentation and can respond by electronic commerce transactions or by setting up appointments on-line. Such a pre-selected group might be an automobile dealership or pet store customers who are given a real time video presentation of today's new arrivals and can set up an appointment or reservation on line. The inventive system can enable a sender to establish a real time streaming video channel associated with that sender and this channel can become a regularly viewed destination, accessible by a pre-selected group or by the general public. The personal, entertainment and commercial applications of the invention will be particularly dramatic with the availability of large screen internet televisions.

The inventive system is spontaneous, real time and available to the general public, and is also different from web casts requiring subscriptions.

A system and method using a mobile device or other source to transmit real time streaming video through a server, accessible to a pre-selected group of recipients, or to the general public, and that enables such recipients to take actions in response, and that provides a solution to known problems is presented. The invention can also act as a social protection system wherein users can upload video from dangerous situations and share the video live with their family and friends to make everyone involved aware of the user's situation, and enables the recipients of the video to take action in response such as by alerting and forwarding video to authorities. The invention can also serve as a new social media format, where users can send spontaneous or planned real time video accessible by either pre-selected groups or the general public and users can access videos to which they are invited or which are available to the general public, and, in either case, users can take actions in response to the accessed videos.

The inventive system and method provides users with a software based application that can be installed on mobile devices or computers. This software can be used to send information, including live video, audio, pictures and/or text. The information is sent via the mobile device or a computer to a server from where it can be displayed live on a web site, with access controlled to a pre-selected group or available to the general public. The web site may be accessed from a mobile device, personal computer, ipad or other tablet, laptop, an internet-television, etc. Members of a pre-selected group will receive email, text or audio alerts that they should access the web site, because a video of interest to them is going to be transmitted. Members of the user's pre-selected security safety group will receive video sent, by the user, to their mobile devices. The video may be forwarded directly to mobile devices of recipients pre-selected by the user, and/or sent to a dispatcher or first responder.

A system for real time video streaming from a device through a website to a designated group for security, personal, entertainment or commercial applications and to enable responses from those recipients, comprising a server having a CPU, the server operable to bi-directionally communicate with the device and with one or more other devices, and the device and the one or more other devices operable to bi-directionally communicate with the server; a module on the server operable to receive notice of an upstream from the device and authenticate a log-in of the device, transmit content of the upstream to the website, transmit the notice of the upstream to one of one or more Designated Recipient Groups selected in accordance with the log-in of the device, and pre-determined recipients in accordance with the log-in of the device, display the content of the upstream on the website, in response to requests from one or more of the pre-determined recipients and the designated recipient groups, enable placement of information in the displayed content, said information describing at least advertising and publicity, and enable responses to the displayed content, said responses comprising at least communicating with the log-in of the device, posting comments, conducting electronic commerce, making appointments and making reservations.

In one aspect, the Designated Recipient Group can be a safety group associated with the log-in of the device, and the module is further operable to route communication between the device and the safety group and record, at the server, the communication from the device to the server. In one aspect, the device can have characteristics comprising at least a geographic location and the server can be further operable to prepare and maintain a map of the geographic location of the device. In one aspect, the communication between the server and the device is performed using one or more of an internet and a cellular network, the communication between the server and personal computers, laptops and internet television is performed using one or more of an internet and a cellular network, the communication between the server and the dispatcher is performed using the internet and the communication between the server and the safety group is performed using one or more of an internet and a cellular network. In one aspect, the bi-directional communication comprises one or more of video, audio, images, text, data in encrypted form and data in unencrypted form. In one aspect, at least one of the device and the log-in of the device is registered with the system. In one aspect, the other devices comprise one or more of a personal computer, a laptop and an internet television, and at least one of the one or more devices and a log-in of one of the one or more devices is registered with the system. In one aspect, the module is further operable to enable searching for video imagery, audio, text and data on the website with respect to particular ZAPCHANNELS and particular senders, and manage data describing the log-in of the device, the data comprising one or more of name, address, emergency contacts, safety group names and telephone numbers, and user emergency notes.

A computer readable storage medium storing a program of instructions executable by a machine to perform one or more methods described herein also may be provided.

Terminology:

DESIGNATED RECIPIENT GROUP: The pre-selected group of Recipients that a sender has designated to have access to video, imagery and other Information transmitted by sender, identified by user names, subscriber lists, mobile device phone numbers, email addresses, and other methods.

DISPATCHER: Person, typically 911 operator, who receives a distress call and/or a person deemed to receive distress calls from users of the inventive application. Alternatively, the dispatcher is a centralized office to handle dispatch and response to ZAP ALERTS.

FIRST RESPONDER: These are police, fire, EMT, Hazmat, SWAT, Anti Terrorism, Bomb Squad or any other agency, body or group, private or government owned, and/or other service providers who respond to 911 and/or distress emergencies.

GEO-LOCATION: Physical location for a mobile device, generally as determined from the device's GPS (global positioning system).

INFORMATION: Information which is communicated between system components, such as video, audio, text, images and/or other data, such as data in encrypted form and data in unencrypted form. Generally information is the exchange of audio, video, image and/or text data between the parties involved in the call. All of the information is stored on a ZAP SERVER.

MOBILE DEVICE: These are devices, typically hardware, that can stream information via the internet or 2G/3G/4G or any other cellular networks to the ZAP SERVER. Examples of these types of devices can be an iPhone, iPad, Android®-based smartphones, Android® Notebook, Chrome book, Amazon® Kindle®, Blackberry® phones, tablet computers, laptop computers, or any other mobile device on which the ZAPAPP can be installed. These devices are not limited to any specific type of hardware or vendor or operating system, but will operate with any device generally considered to be a mobile device, that can connect to a network, transmit information to a server and receive information from a server. Typically, only software is provided to be installed on the mobile device, and the hardware is owned by the sender.

RECIPIENT: Person who logs on to the ZAPCLOUD WEBSITE to access video, imagery and other Information from Senders, including persons who are part of a pre-selected Designated Recipient Group of a particular sender who can access video from that sender, and persons in the general public who can access only video which senders make available for general public access.

SAFETY GROUP: A user can create, as a special type of Designated Recipient Group, a "safety group" of other users, typically friends and/or family, who are to be notified when the creating user initiates a distress signal. Each member of the safety group has a mobile device with the ZAPAPP on it. The ZAP SERVER will send the alert to the safety group as well as to the dispatcher. The safety group will receive the alert whether or not there is a dispatcher, which has licensed the ZAP SYSTEM, in the vicinity. If the creating user is in a situation that is "potentially dangerous" but not an emergency situation, for example if the creating user is walking alone in a dark alley, or someone knocks on the door of the creating user at 3 in the morning, then the creating user can transmit the video from his mobile device via ZAPAPP to his pre-defined safety group. The safety group can view the video from the situation, know about the situation, and can alert the police, other authorities and/or other relevant people, if appropriate.

SENDER: Anyone who has the ZAPAPP on his or her mobile device, or installed on a computer, and by use of the mobile device, camcorder, DVD or other video source initiates a transmission of video to the ZAP SERVER.

UPSTREAM: When a Sender initiates the ZAPAPP to send video and other Information to the ZAP SERVER, then he is conducting an "Upstream". The Information provided in the Upstream can be limited in access to one or more of the Sender's Designated Recipient Groups, or can be accessible by the general public, as specified by the Sender. The Sender can specify that the Upstream is limited in access to the sender's Safety Group. The call can be an Emergency Call or a non-emergency call such as reporting a flat tire to the sender's Safety Group.

ZAP SERVER: Hardware and/or software which manages the ZAP SYSTEM including all communications among the Senders, Recipients, Designated Recipient Group and the general public, the Dispatcher, the First Responders, and the Safety Group(s). ZAP SERVER receives and processes Information sent by Senders and maintains databases, such as a database of Designated Recipient Groups.

ZAP CAMERA: A camera installed in the city or county by ZAP or a camera installed by the city or county or other party that can be accessed by the ZAP SYSTEM.

ZAPCHANNEL: A real time streaming video channel associated with a particular Sender and which can become a regularly viewed destination containing video imagery and other Information, accessible by a Designated Recipient Group or by the general public.

ZAPAPP: A software application which is downloaded onto the mobile device (or other computer) of the Sender and is utilized by the Sender to conduct an Upstream of video imagery or other Information to the ZAP SERVER. The same software application is utilized by a Recipient to access video and other information which has been upstreamed.

ZAP911 SYSTEM: The system described in commonly-owned U.S. patent application Ser. No. (28235), "SYSTEM AND METHOD FOR REPORTING AND TRACKING INCIDENTS WITH A MOBILE DEVICE" (hereinafter "U.S. application Ser. No. (28235)") which enables Senders, via the ZAPAPP, to send video and other Information to the ZAP SERVER, which identifies the Sender's location by GPS and routes the video and other Information to the applicable Dispatcher in a ZAP PROTECTED COUNTY, and to the Sender's Safety Group in both a ZAP PROTECTED COUNTY and a Non-ZAP PROTECTED COUNTY.

ZAP PROTECTED COUNTY: A County where the ZAP911 system has been implemented. This would include providing the dispatchers in the county with ZAP DISPATCH software and providing the FIRST RESPONDERS in the county with the FIRST RESPONDER software/hardware.

NON-ZAP PROTECTED COUNTY: A county where the ZAP SYSTEM has not been implemented. The dispatchers in this county have access to limited information about an incident via a web site provided by ZAP. The FIRST RESPONDERS are not provided with any software or hardware in such counties.

ZAPCLOUD WEBSITE. A Website accessible by Recipients (via a mobile device, personal computer, ipad or other tablet, laptop or internet television, etc.) which displays real time live video and other Information Upstreamed by Senders, as well as archived Information Upstreamed by Senders. When a Sender limits information access to one or more of his Designated Recipient Groups, this information can only be accessed on the ZAPCLOUD WEBSITE by that Designated Recipient Group. Information which a Sender has made available to the general public can be accessed on the ZAPCLOUD WEBSITE by the general public which has the ZAPAPP. The ZAPCLOUD WEBSITE may also facilitate response actions by the Recipients to Information from Senders. These response actions can include conducting electronic commerce, making appointments and reservations, sending text, data or confirmations and, for emergency situations, alerting and forwarding video to authorities.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

Figure 1:
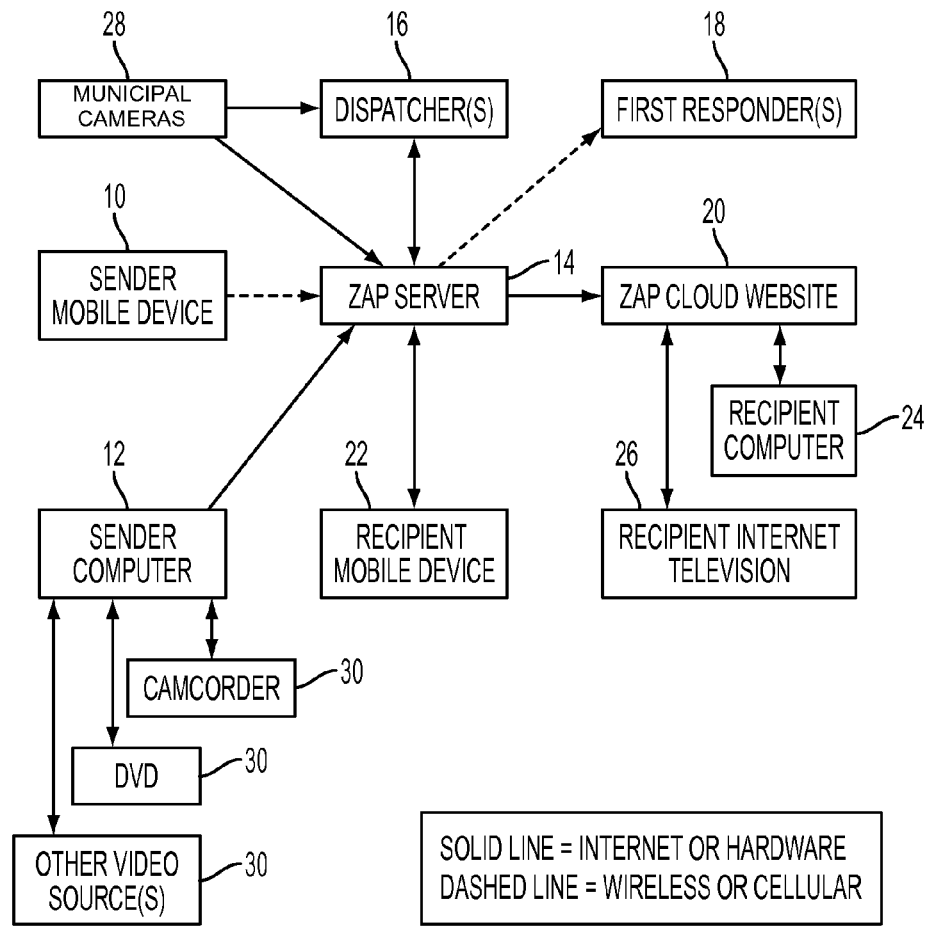
FIG. 1 shows the components of the inventive system in an exemplary embodiment.

A novel system and method using a mobile device or other source to transmit real time streaming video through a server, accessible to a pre-selected group of recipients, or to the general public, and which enables such recipients to take actions in response, is presented.

The inventive system and method provides users with a software based application, ZAPAPP, that can be installed on mobile devices as well as other computers. This software can be used to send information, including live video, audio, pictures and/or text. The Information is sent via the mobile device or other computer to a server from where it can be displayed live on a web site, the ZAPCLOUD WEBSITE, with access limited to a pre-selected group or available to the general public. The web site may be accessed from a mobile device, personal computer, ipad or other tablet, laptop or from an internet-television, etc. Members of the pre-selected group will receive email, text or audio alerts that they should access the web site because a video of interest to them is going to be transmitted. Members of the Sender's Safety Group will automatically receive the video of a safety situation from the Sender and can simply click on their ZAPAPP to view the video, without having to otherwise access the ZAPCLOUD WEBSITE. When ZAPAPP is installed on a mobile device, the Sender Upstreams video and other Information on a wireless basis to the ZAP SERVER. When ZAPAPP is installed on a personal computer, laptop or internet television, etc., the Sender Upstreams video and other Information via the internet to the ZAP SERVER and the ZAPAPP as so installed can have additional features, such as features to enable video editing, advertising, electronic commerce and other transactions.

The inventive system can be integrated with the ZAP911 system presented in U.S. application Ser. No. (28235) for ZAP PROTECTED COUNTIES. Recipients who are members of a Sender's Safety Group (a special Designated Recipient Group) can receive video from the Sender who is in a dangerous or distressed situation and can forward such video and other Information to a Dispatcher for a ZAP PROTECTED COUNTY. Utilizing the ZAP911 System, the Dispatcher can assess the situation reported by the Sender's Safety Group and, if the situation warrants action, then the information can be forwarded to the appropriate personnel, e.g., the First Responders, such as police, fire, hazmat, bomb squad, etc., and the Dispatcher can integrate video camera feeds from ZAP CAMERAS in the vicinity of the incident for use by the Dispatcher and First Responders.

The system also enables a Sender to establish a real time streaming video channel associated with that Sender (referred to as a ZAPCHANNEL). This ZAPCHANNEL can become a regularly viewed channel or destination on the ZAPCLOUD WEBSITE, accessible by a pre-selected group or by the general public, via mobile devices, personal computers, laptops, internet television, etc., and utilized for personal, entertainment, advertising, electronic commerce and other commercial applications. Each ZAPCHANNEL can be customized by the Sender, with respect to the Designated Recipient Groups to have access from time to time and with respect to the content on the ZAPCHANNEL, which in addition to video will include other Information and the ability of the Recipients to take actions in response to the Information on the ZAPCHANNEL, such as conducting electronic commerce transactions, making appointments and reservations, entering text and data, and many other responses.

The invention is centered around three pieces of software: ZAPAPP, ZAP SERVER and the ZAPCLOUD WEBSITE. In ZAP PROTECTED COUNTIES which have implemented the ZAP911 System, the invention also utilizes ZAP DISPATCH and ZAP FIRST RESPONDER software. These pieces work together to facilitate an end-to-end video, audio, images and/or text medium of communication between the Sender, the ZAP SERVER, the Recipients and the ZAPCLOUD WEBSITE, and in ZAP PROTECTED COUNTIES, the Dispatcher and First Responders.

FIG. 1 shows the components of the inventive system in an exemplary embodiment. As shown in FIG. 1, the system can include a Sender's mobile device 10, a personal computer 12 with video inputs from a camcorder 30, DVD 30 and/or other video sources 30, a ZAP SERVER 14, ZAP DISPATCH software located on a computing device 16, one or more First Responder devices 18, ZAPCLOUD WEBSITE 20, a Recipient's mobile device 22, a Recipient's personal computer 24, a Recipient's internet television 26, ZAP CAMERAS 28 installed by ZAP or accessible by the ZAP SERVER. These can be cameras installed at public locations in the county. The camera's video feed can be provided to the ZAP SERVER over the internet. The ZAP DISPATCH Software 16, ZAP FIRST RESPONDER Software 18, and ZAP CAMERAS 28, are part of the ZAP911 System and are only available in ZAP PROTECTED COUNTIES. In a non-ZAP PROTECTED COUNTY, the Dispatcher can access limited information about the incident via a web page provided by ZAP.

The components of the inventive system can communicate via the Internet, as shown with the solid lines. In addition or in the alternative, communication can occur via cellular networks (2G/3G/4G or any other type of cellular network available), as shown with the dotted lines. Specifically, the ZAP SERVER 14 can bi-directionally communicate with one or more of the mobile devices 10 and 22 via the internet or cellular networks and with one or more of the personal computers and internet televisions 12, 24 and 26 over the internet, with ZAP DISPATCH software 16 via the internet and with ZAP First Responder mobile device(s) 18 via the cellular networks.

ZAPAPP, the novel software application, is software that a Sender can download and install on his or her mobile device 10 or on a personal computer 12. ZAPAPP provides the user functionality and interface with other components. In one embodiment, this software can be downloaded from an online repository, such as "Apple® online app store", "Android® store", the ZAP WEB SITE, etc. In another embodiment, this software can be downloaded onto a personal computer from the ZAPCLOUD WEBSITE.

Figure 2:
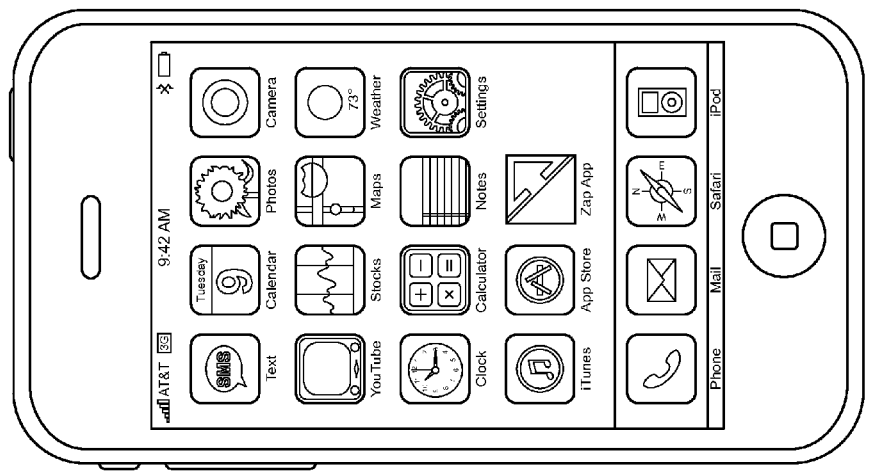
FIG. 2 shows an exemplary mobile device screen with ZAPAPP installed and a ZAPAPP icon displayed on the screen.

FIG. 2 shows an exemplary mobile device screen with ZAPAPP installed and a ZAPAPP icon displayed thereon. The display would be similar for a personal computer with ZAPAPP installed.

ZAPAPP allows a user to perform the following functions: Register with the ZAP SYSTEM, Create a Safety Group, Create one or more Designated Recipient Groups, Make emergency or non-emergency calls, Stream Video and/or send images (pictures), Receive alerts, Provide geo-location to a server, Upstream video and other Information accessible on the ZAPCLOUD WEBSITE to Designated Recipient Groups and alert the members of those groups, Upstream video and other Information accessible on the ZAPCLOUD WEBSITE by the general public, create and tag a ZAPCHANNEL on the ZAPCLOUD WEBSITE, access the ZAPCLOUD WEBSITE to view content in response to an alert to a Designated Recipient Group or Safety Group, or to view content accessible to all Recipients, and in ZAP PROTECTED COUNTIES, communicate with the Dispatcher and/or First Responder(s) using voice or text data, Get status updates when a call is in progress, and Tag calls. ZAPAPP can receive information from the ZAP SERVER, such as a safety group alert and/or video stream and a Designated Recipient Group alert.

Figure 3:
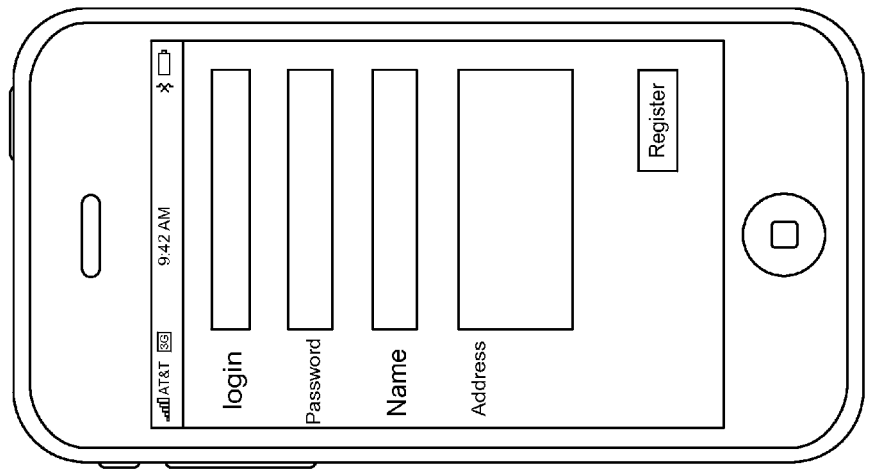
FIG. 3 is an exemplary screen illustrating one embodiment of ZAPAPP registration.

ZAPAPP allows a user to register with the ZAP SYSTEM. In the ZAP SYSTEM each user has a login id and password that uniquely identifies that user in the system. FIG. 3 is an exemplary screen illustrating ZAPAPP registration. Other screen formats can also be used.

Figure 4:
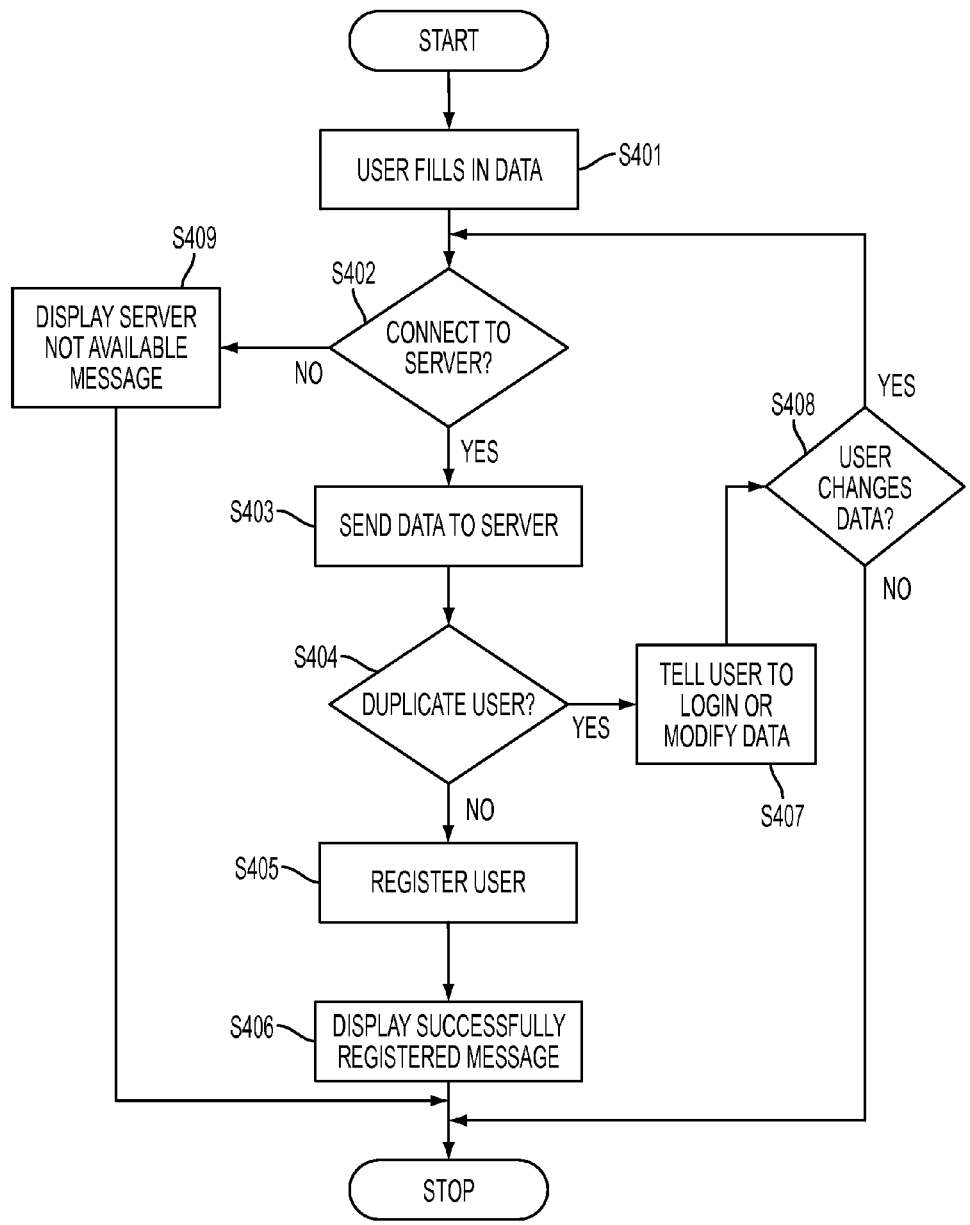
FIG. 4 is a flow diagram of the registration process.

FIG. 4 is a flow diagram of the registration process. In step S401, the user fills in data, such as a login, e.g., user name, password, name and address. Additional data can include User Home/Work Address, User Telephone Number, User Emergency Contact Name(s), User Emergency Contact Phone Number(s), and/or User Emergency Notes. Not all of this data is required for registration. If the user is connected to the ZAP server (S402=YES), then the data is sent to the Server in step S403. If the user is a not a duplicate (S404=NO), then the user is registered in the system in step S405. A message indicating that the user has successfully registered is displayed in step S406 and the registration process is complete.

If the user is a duplicate (S404=YES), then the user is instructed to either login or to modify the user name in step S407. If the user changes the data, e.g., modifies the user name, (S408=YES), then processing continues at S402. Otherwise (S408=NO), processing terminates.

If the user is not connected to the Server (S402=NO), then a message indicating that the server is not available is displayed and processing terminates.

The ZAPAPP allows a user to create a safety group, that is, a group of ZAP MEMBERS, e.g., friends and/or family of the user, who can be sent an alert when a user makes an Emergency or a Non-Emergency call. When a member of the safety group clicks on or accepts the alert, he sees what is being streamed from the mobile device of the user. The video stream alert to the safety group will indicate whether or not the dispatcher has received the alert from the user and is managing the alert as an incident. If the alert to the safety group indicates there is no dispatcher involved, or the dispatcher has rejected the user alert, or the dispatcher has not elevated the user alert to an incident, then one or more members of the safety group can initiate a call to 911 when he or she feels that user's environment or situation warrants such a call.

As an example, if someone knocks on a user's the door in the middle of the night, then the user can send out an alert, e.g., a non-emergency call, that can be received by the safety group. The users in the safety group can view the video of what is going on in the user's environment and if the situation turns hostile or unsafe, then 911 can be called or alerted by anyone in the safety group. Since video is recorded on the ZAP SERVER from the beginning, the dispatcher can access the entire video regardless of when he or she is notified.

A user can be added to another user's safety group by searching the ZAP DATABASE for the desired user based on name, phone number or login id. Once selected, a request is sent to the selected user who can then accept the incoming request to be part of another's safety group, or deny the request. Accepting the request adds the selected user to the other user's safety group. Denying the request results in no action being taken.

Figure 5:
FIG. 5 is an exemplary screen of a sender's safety group.

FIG. 5 is an exemplary screen of a user's safety group. As shown, the screen displays the current members of the safety group, pending requests to other potential members, and requests from system users to join their safety groups. The user can add more members to his or her safety group by clicking on the "Add More Users" button.

Figure 6A:
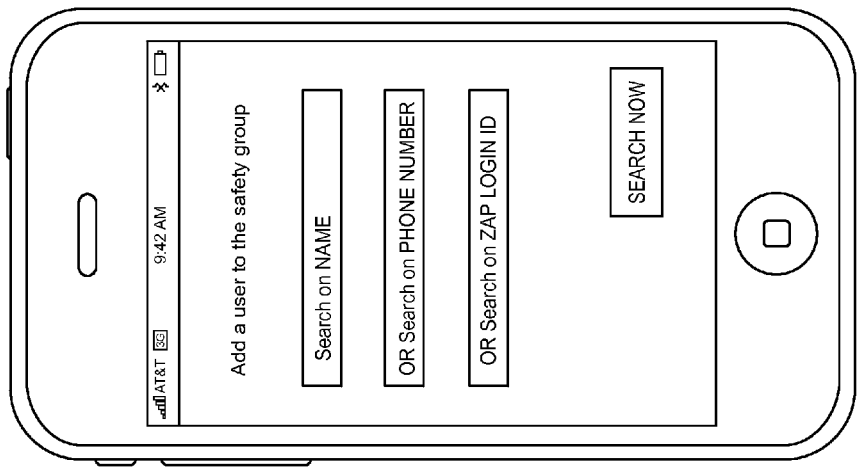
FIG. 6A is an exemplary screen showing searching for a specific user to be added to a sender's safety group.
Figure 6C:
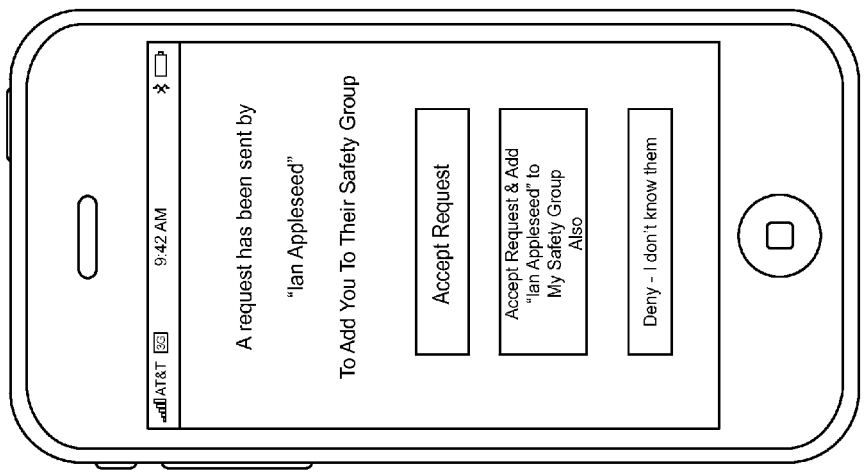
FIG. 6C is an exemplary screen showing receiving a request to be added to a sender's safety group.
Figure 6B:
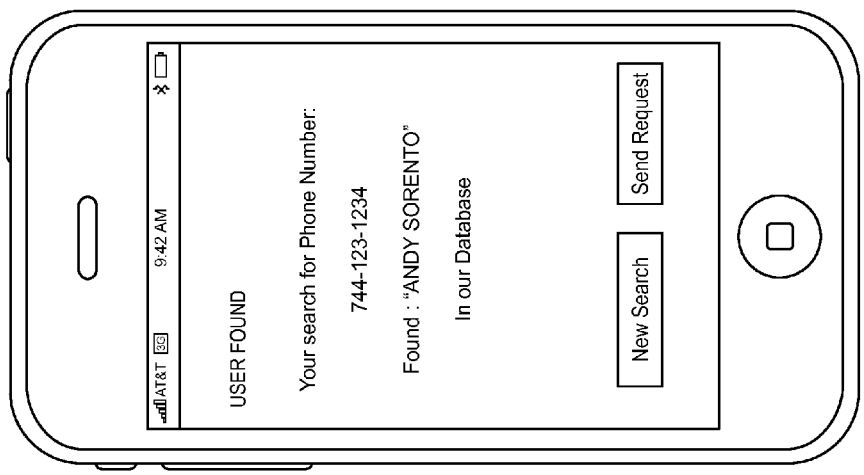
FIG. 6B is an exemplary screen showing search results for a specific user to be added to a sender's safety group.

FIGS. 6A, 6B and 6C show exemplary screens employed when adding new members to a user's, e.g., Sender's, safety group. FIG. 6A shows searching the ZAP DATABASE of users for a specific user according to name, phone number or login id. The user enters one of name, phone number or login id in the appropriate area of the screen and clicks on "Search Now" to begin the search. FIG. 6B shows the search results, e.g., "User Found". If this is the desired ZAP DATABASE MEMBER, the user can click on "Send Request" to ask the member to join the user's safety group. Otherwise, the user can click on "New Search" to initiate a new search. FIG. 6C shows the screen displayed when the "Send Request" is clicked on the screen in FIG. 6B. As shown in FIG. 6C, the member receives a request that indicates the name of the user requesting that the member join the user's safety group, and the member can choose one of three options. The member can accept the request, by clicking on "Accept Request" or deny the request by clicking "Deny—I don't know them". In addition, the member can accept the request and also request that the user join the member's safety group by clicking "Accept Request & Add "USER" to My Safety Group". Other screen formats can be used to perform these functions.

When a situation in which a user or Sender becomes a user-in-distress, depending on whether the user makes an Emergency or a Non-Emergency call, the ZAPAPP can perform the following operations. If the user has specified that the call is an Emergency Call, e.g., by clicking or tapping the emergency box, the ZAP SERVER will determine whether the user is located in a ZAP PROTECTED COUNTY or a non-ZAP PROTECTED COUNTY. The distress signal will include the user's geo-location, captured by ZAPAPP from the user's mobile device. When the distress signal is sent out or transmitted, the ZAP SERVER determines the location of the user-in-distress and if the call is made from a ZAP PROTECTED COUNTY then the ZAP SERVER routes the call to the nearest Dispatcher. For a NON ZAP PROTECTED county, since there is no Dispatcher, the alert is sent by the server only to the safety group members. If the user has specified that the call is a non-Emergency Call, by clicking or tapping the non-Emergency box, then the alert is sent by ZAP SERVER only to the user's safety group members.

The user can stream information, such as video, audio, images, text and other data or a combination thereof, to his safety group and/or the dispatcher. ZAPAPP typically uses the inbuilt camera in the mobile device to capture the video and/or pictures in situations where the user does not have a high speed connection available. This process generally occurs in the background. The user points the camera in the direction of the incident and ZAPAPP basically captures the "view" of the camera on the mobile device and streams this view in video format to ZAP SERVER. The format can be H.264, and can vary from device to device. The video is sent to the server using HTTP, FTP, RTP, RTMP, RTSP or any other streaming protocol as appropriate. ZAPAPP can also be installed on a personal computer, laptop, internet television or other device, and the video content can be input to such computer via a camcorder, camera, DVD, or other source. ZAPAPP can have additional features, as discussed above, to enable video editing, advertising, electronic commerce and other transactions. Due to the greater bandwidth required by these features, this embodiment may be more appropriate for commercial and creative senders who wish to Upstream video and have it displayed on the ZAPCLOUD WEBSITE and to have a ZAPCHANNEL associated with such Senders.

The transmission, e.g., video streaming in one embodiment, can be adjusted in accordance with the bandwidth available to transmit the data when the call is made. For example, if the bandwidth is good, then video-color data is streamed. If the bandwidth is medium, then a lower frame rate video is sent. If the bandwidth is less than medium, then gray scale video is sent. If the bandwidth is minimal, then the only data sent is images that are taken every two to five seconds and uploaded to the server for transmission to the appropriate devices.

ZAPAPP has built-in capabilities to receive alerts from the user or ZAP SERVER. The alert can be sent by one or more of the following methods. PUSH notification can be used to send messages to mobile devices. This technology is typically deployed to send alerts to users of APPLE® and ANDROID®-based devices. A member of the user-in-distress' safety group can get an alert via PUSH notification or its equivalent technology on different devices. A Short Message Service (SMS) message is sent along with the PUSH notification.

When the user makes a call from a ZAP PROTECTED COUNTY, the dispatcher receives the alert directly on his computer. This alert is generally sent using HTTP protocol and not PUSH notification, since this alert is being sent to a computer device and not a mobile device.

Figure 7:
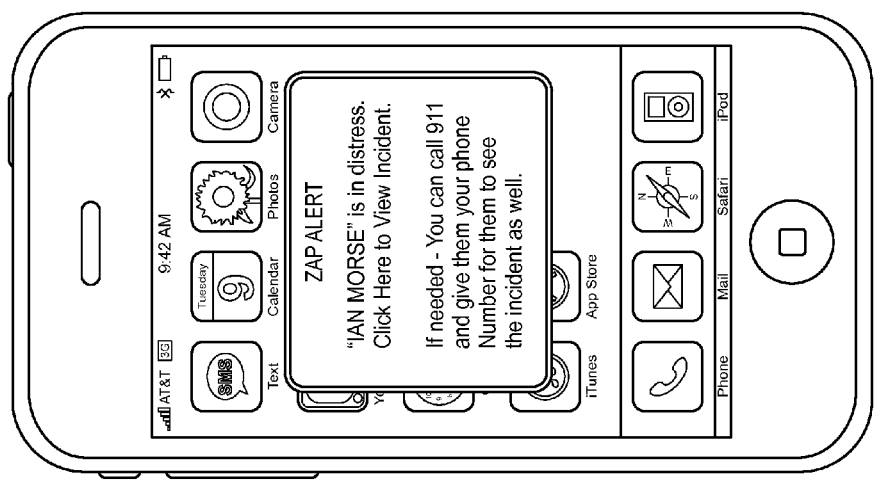
FIG. 7 is an exemplary screen of a safety group member receiving an alert.

FIG. 7 shows a safety group screen receiving an alert in an exemplary embodiment. Other screen displays may be used. FIG. 7 shows the situation where the county is not a ZAP PROTECTED COUNTY. Each member of the user-in-distress' safety group receives an alert message of "ZAP ALERT 'Ian Morse' is in distress . . . . Click here to view incident . . . ." The safety group member can click to begin video streaming the user information via the ZAP SERVER.

Figure 8A:
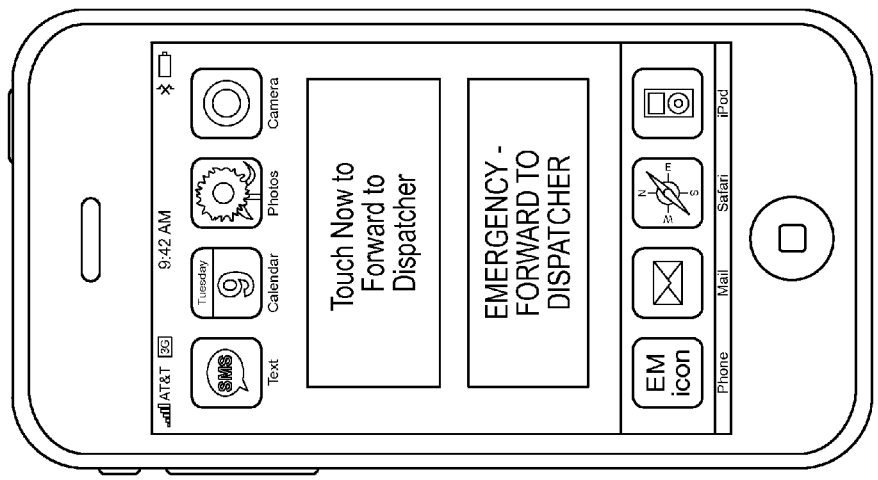
FIG. 8A is an exemplary screen of a Safety Group member forwarding video imagery of an emergency situation (received from the Sender), to a Dispatcher in a ZAP PROTECTED COUNTY.

FIG. 8A shows an example of a Safety Group member forwarding video of an emergency situation (received from the Sender) to a Dispatcher in a ZAP PROTECTED COUNTY.

In a non-emergency situation, that is when the user makes a non-Emergency Call, if anyone in the safety group or the caller himself wishes to send an alert to the Dispatcher then he can do so by clicking on and/or pressing the appropriate button on the interface provided in the ZAPAPP. This embodiment is only available in ZAP PROTECTED counties, that is where the PSAP or other 911 system operator has licensed the ZAP911 system and the ZAP911 system has been deployed to provide software and hardware to the Dispatchers and First Responders. For non-ZAP PROTECTED counties, the only option is to call 911 using the regular phone line and let the dispatcher know the phone number of the caller.

Figure 8B:
FIG. 8B is an exemplary screen of a Dispatcher receiving an alert on the ZAP WEB SITE via the ZAP DISPATCH software in a ZAP PROTECTED COUNTY.

As an example, in this non-emergency situation, when a user sends out a non-emergency distress signal that goes to his safety group, someone from the safety group can inform the 911 operator or dispatcher if the situation appears dangerous by clicking on or pressing the appropriate button from his screen. When the button is pressed from the mobile device of the safety group member, it sends a signal regarding this incident to the ZAP SERVER. The signal is sent via HTTP using the 3G, 4G or any other cellular networks or normal internet networks if one is available. When the ZAP SERVER receives such a signal, it in turn determines the geo-location of the incident and sends an alert to the Dispatcher who is nearest to the geo-location of the user-in-distress. The alert then shows up on the screen of the Dispatcher in the ZAP DISPATCH software as shown in FIG. 8B. This is available only in ZAP PROTECTED Counties.

Once the user and his mobile device are registered, if the user dials 911 via his mobile device but not through ZAPAPP, the ZAPAPP recognizes the dialed number and gives the user the option to stream video to the ZAP SERVER.

Figure 9:
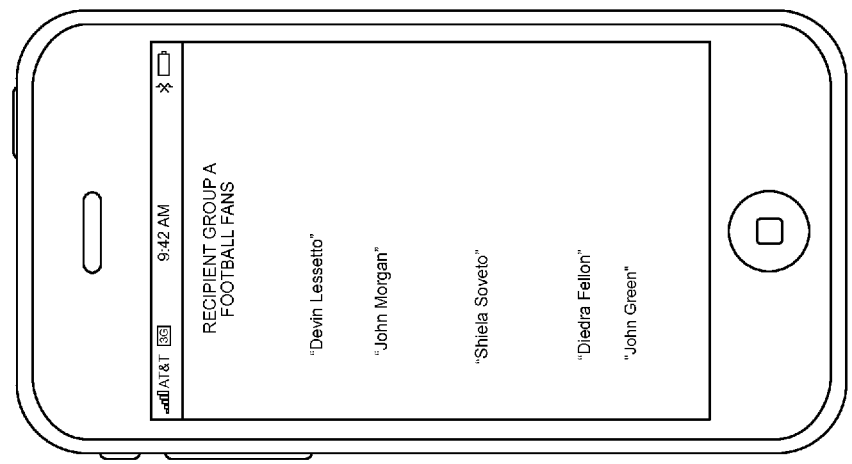
FIG. 9 is an exemplary screen of a Designated Recipient Group of a Sender.

FIG. 9 is an exemplary screen of a Designated Recipient Group of the Sender. The Sender can establish several different Designated Recipient Groups, and then select the members of each of the Designated Recipient Groups.

Figure 10:
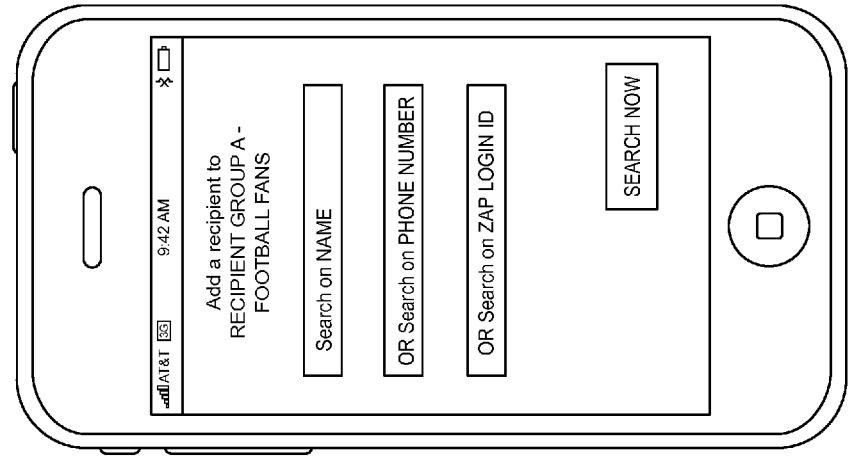
FIG. 10 is an exemplary screen showing searching for a specific recipient to be added to a Designated Recipient Group of a Sender.
Figure 11:
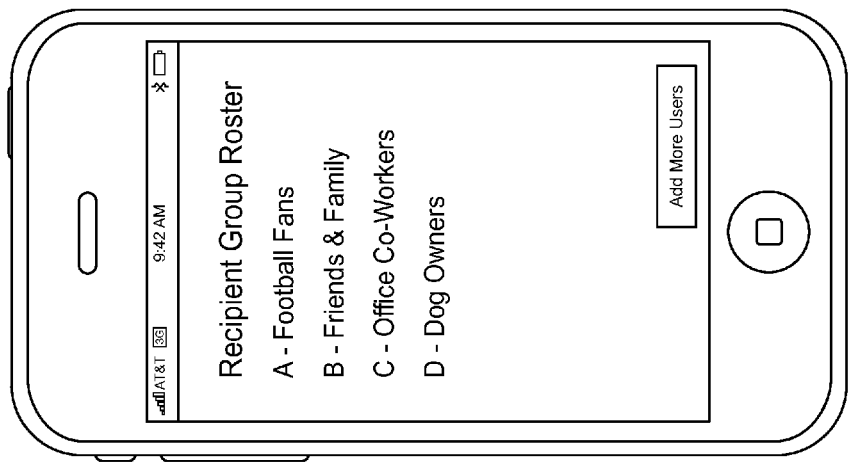
FIG. 11 is an exemplary screen showing a Sender's roster of Designated Recipient Groups.

FIG. 10 is an exemplary screen showing searching for a specific Recipient to be added to a Designated Recipient Group of a Sender. FIG. 11 is an exemplary screen showing a Sender's roster of Designated Recipient Groups.

The Sender can utilize ZAPAPP to initiate an Upstream to the ZAP SERVER of video and other Information. The Sender can designate which Designated Recipient Group or Groups will be invited, and have access, to view the Upstream on the ZAPCLOUD WEBSITE. Alternatively, the Sender can designate that all Recipients who have ZAPAPP will be permitted access to view the Upstream on the ZAPCLOUD WEBSITE.

Figure 12:
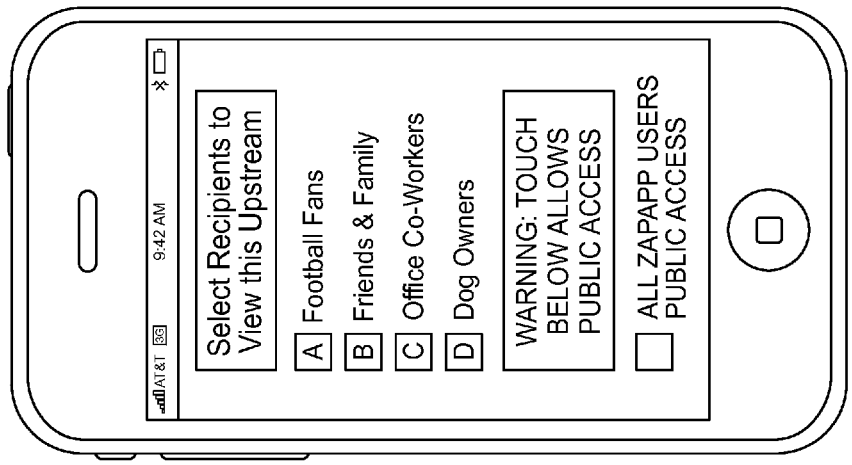
FIG. 12 is an exemplary screen showing Sender's selection of which Designated Recipient Group—or the general public—may have access to a particular Upstream.

FIG. 12 is an exemplary screen showing Sender's selection of which Designated Recipient Group—or the general public—may have access to a particular Upstream. Each Sender's roster of Designated Recipient Groups, and the members of each such Designated Recipient Group, are maintained on the ZAP SERVER's database.

Once the Sender has initiated the Upstream to the ZAP SERVER, it will process the Sender's selection of Designated Recipient Groups (if any) who are invited to access the content of the Upstream on the ZAPCLOUD WEBSITE. The ZAP SERVER will send an alert, for example, via email or text or visual alerts, etc., to each member of the Designated Recipient Groups selected by the Sender to access the content of the Upstream on the ZAPCLOUD WEBSITE. If the Sender has designated that all Recipients with ZAPAPP may access the content of the Upstream on the ZAPCLOUD WEBSITE, the ZAP SERVER will send the same type of alert to the members of all of the Sender's Designated Recipients Groups, but will NOT send an alert to Recipients who are not a member of any of the Sender's Designated Recipient Groups, unless such outside Recipient has notified the ZAP SERVER that such Recipient desires to receive alerts whenever that specific Sender makes content available to the general public on the ZAPCLOUD WEBSITE. This latter feature is useful, for example, when a Sender has established a ZAPCHANNEL, and a Recipient wants to be alerted that new content has been Upstreamed by the Sender associated with that ZAPCHANNEL and such Upstream is available to the general public.

Figure 13B:
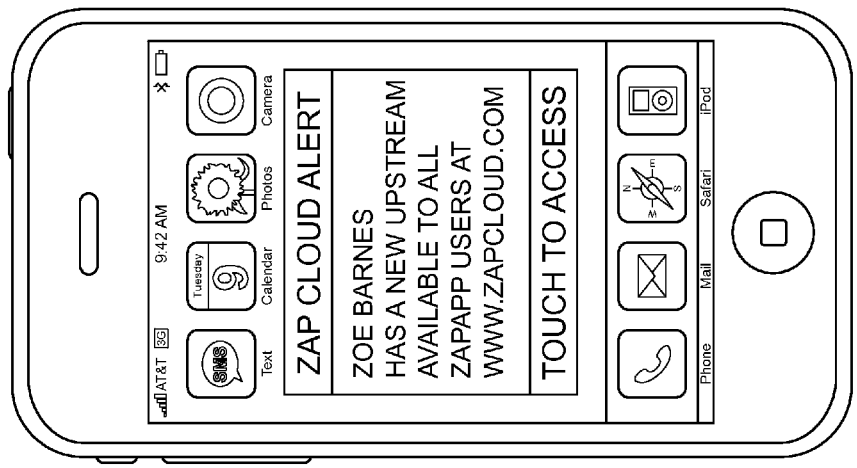
FIG. 13B is an exemplary screen of a Recipient (who is not a member of a Designated Recipient Group of the Sender) receiving an alert that a Sender (that the Recipient has identified for such purpose) has Upstreamed new content available on the ZAPCLOUD WEBSITE for viewing by the general public (i.e. all Recipients which have the ZAPAPP).
Figure 13A:
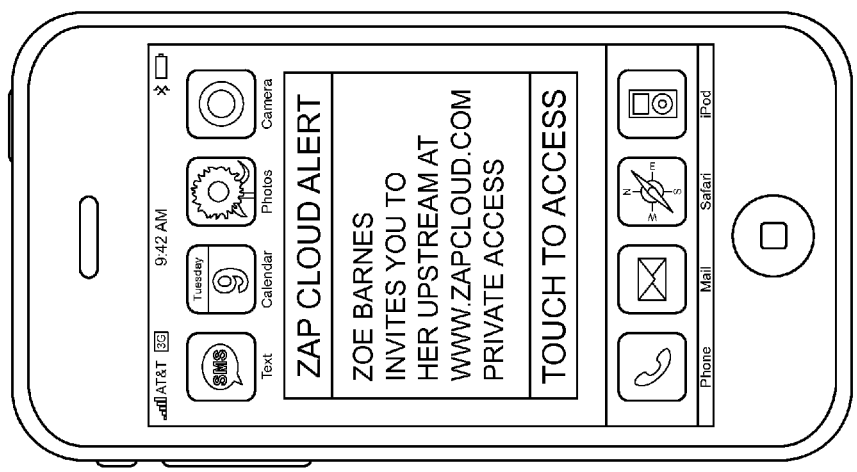
FIG. 13A is an exemplary screen of a Designated Recipient Group receiving an alert that a Sender is inviting them to access the ZAPCLOUD WEBSITE.

FIG. 13A is an exemplary screen of a member of a Designated Recipient Group receiving an alert that a Sender is inviting them to access the ZAPCLOUD WEBSITE to view new content Upstreamed by that Sender. FIG. 13B is an exemplary screen of a Recipient (who is not a member of a Designated Recipient Group of the Sender) receiving an alert that a Sender (that the Recipient has identified for such purpose) has Upstreamed new content available on the ZAPCLOUD WEBSITE for viewing by the general public (i.e. all Recipients which have the ZAPAPP).

Figure 14:
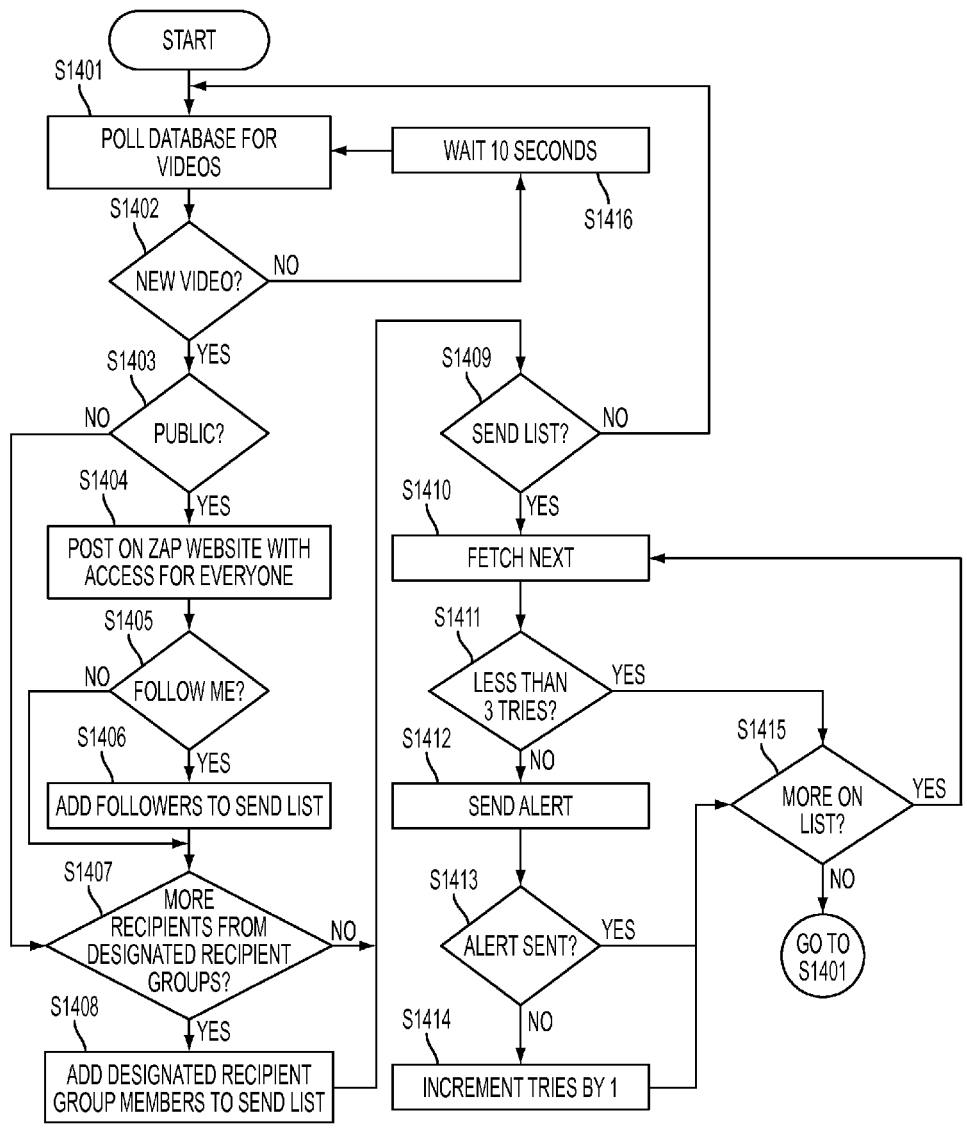
FIG. 14 is a flow diagram of the process for alerting members of a Designated Recipient Group and alerting "followers" of a particular Sender upstreaming video accessible to all ZAPAPP recipients.

FIG. 14 is a flow chart showing how the ZAP SERVER alerts members of the Designated Recipient Groups of a Sender, and alerts certain outside Recipients, in the circumstances shown in FIG. 13B and described above. As shown in FIG. 14, in step S1401, the database is polled for videos. If there is a new video found (S1402=YES), then the audience for the video is determined. If this video is for anyone having the ZAPAPP, e.g., if the video is public, (S1403=YES), then in step S1404 this video is posted on ZAP CLOUD WEBSITE with access available to everyone. Next, an alert is sent to the appropriate recipients as follows. If a recipient has requested to receive public postings of the sender, e.g., "follow me" (step S1405=YES), then this recipient is added to the send list in step S1406. When the recipient is added or if there is no "follow me" (S1405=NO), then determine whether there are more recipients.

If there are more recipients who are members of Designated Recipient Groups (S1407=YES), then these recipients are added to the send list in step S1408. If there are no more recipients (S1407=NO) or the recipients have been added in step S1408, then check the send list in step S1409. If the send list has more recipients (S1409=YES), then the next recipient is fetched in step S1410. If there are less than three tries (S1411=YES), then an alert is sent to the recipient in step S1412. If the alert is successfully sent (S1413=YES), then determine whether there are more recipients on the list. If the alert is not successfully sent (S1413=NO), then increment the number of tries in step S1414. When the alert is successfully sent or the number of tries is incremented, if there are more recipients on the list (S1415=YES), then continue processing at step S1410. Otherwise, if there are no more recipients (S1415=NO), then continue processing at step S1401.

If the send list has no more recipients (S1409=NO), the continue processing at step S1401.

If the video is not to be made public (S1403=NO), then continue processing at step S1407.

If there is no new video (S1402=NO), then at step S1416, wait a predetermined number of seconds, such as 10 seconds.

After the ZAP SERVER processes the Sender's selections as to the Upstream being made accessible on the ZAPCLOUD WEBSITE by Designated User Groups of the Sender, or the general public, and sends the alerts referred to above, the ZAP SERVER posts the Upstream on the ZAPCLOUD WEBSITE, including live streaming of video and availability of the other Information Upstreamed by the User. The ZAP SERVER controls access to the ZAPCLOUD WEBSITE in accordance with the selections the Sender has made with respect to that Upstream. If the Sender has selected that only members of one or more Designated Recipient Groups of the Sender can access the Upstream, the ZAP SERVER will limit access to the Upstream on the ZAPCLOUD WEBSITE to the members of the Designated Recipient Groups selected by the Sender, and all other Recipients will be blocked from such access. If the Sender has selected that the general public may access the Upstream, then the ZAP SERVER will enable all Recipients who have the ZAPAPP to access the Upstream on the ZAPCLOUD WEBSITE.

Figure 15:
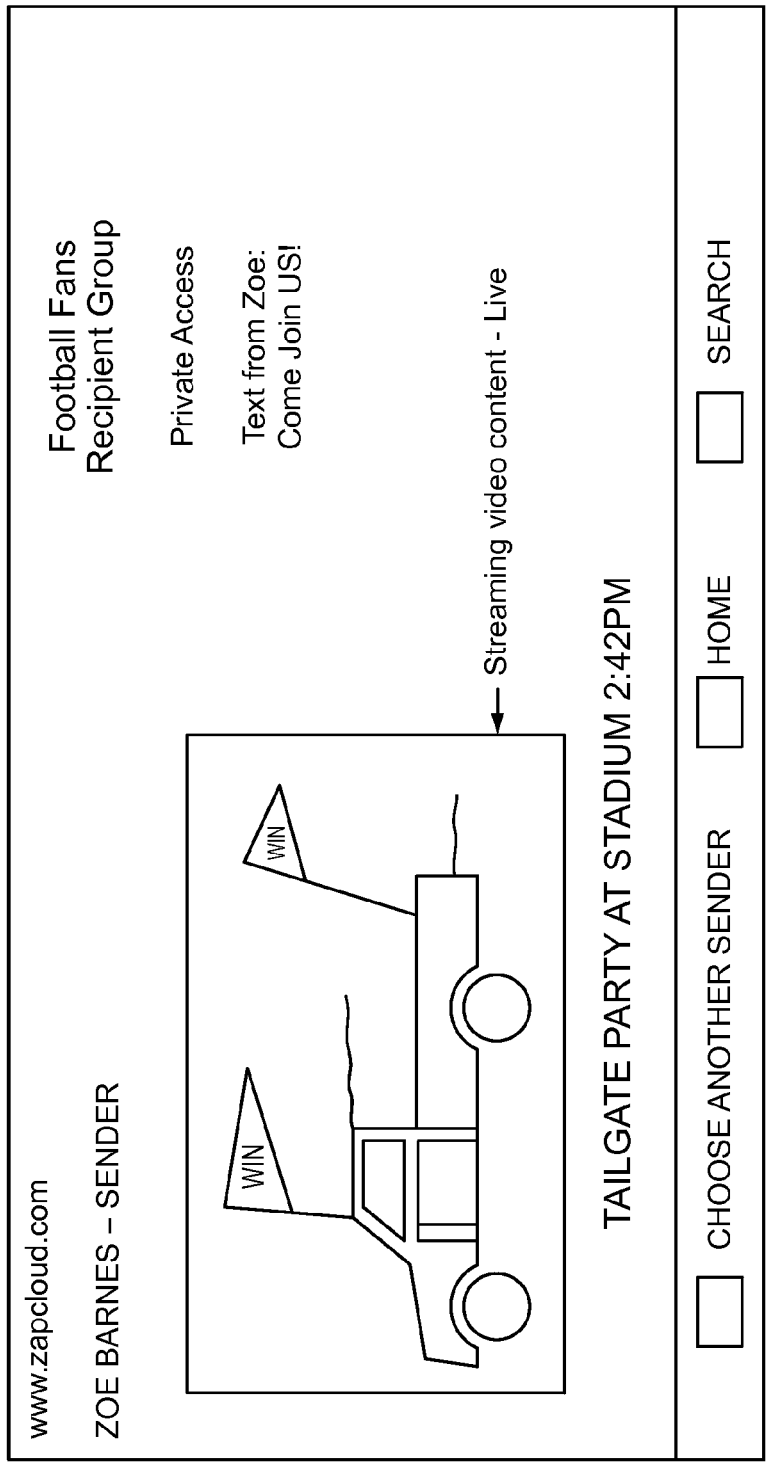
FIG. 15 is an exemplary screen of a ZAPCLOUD WEBSITE displaying the video imagery and other Information Upstreamed by the Sender for viewing by a Designated Recipient Group.

FIG. 15 is an exemplary screen of the ZAPCLOUD WEBSITE displaying the video and other Information Upstreamed by the Sender for viewing by a Designated Recipient Group. In this example, the display sets forth that access is limited to members of the named Designated Recipient Group of the Sender.

Figure 16:
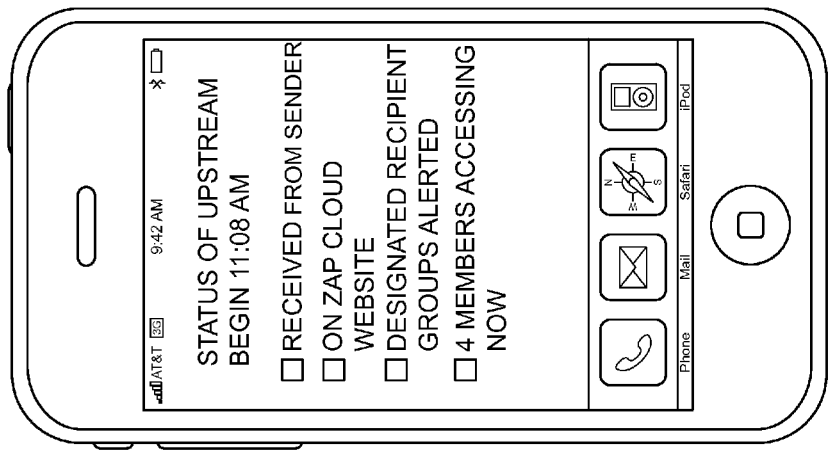
FIG. 16 shows an exemplary screen of how Upstream status is provided to the Sender.

FIG. 16 shows an exemplary screen of how Upstream status is provided to the Sender. ZAPAPP shows the Sender the status of his or her Upstream at all times. Examples of call status can include Alert sent to safety group, Upstream sent to and available for access on ZAPCLOUD WEBSITE by a one or more Designated Recipient Groups selected by Sender, or by the general public (i.e. all Recipients having the ZAPAPP), Alert send to Designated Recipient Groups inviting them to access the Upstream. In ZAP PROTECTED COUNTIES, if a member of the Sender's Safety Group has forwarded the Upstream to a Dispatcher, then the ZAPAPP will also show the Sender one or more of the following: Alert was sent to Dispatcher, Dispatcher previewing video, Dispatcher accepted the incident, First Responder alerted, First Responder on his way. These status signals, as well as others not listed, keep the user appraised at all times about the status of his Upstream. These signals can be icons as well as or instead of text. The status signals can vary by whether the county is ZAP PROTECTED or not.

Figure 17:
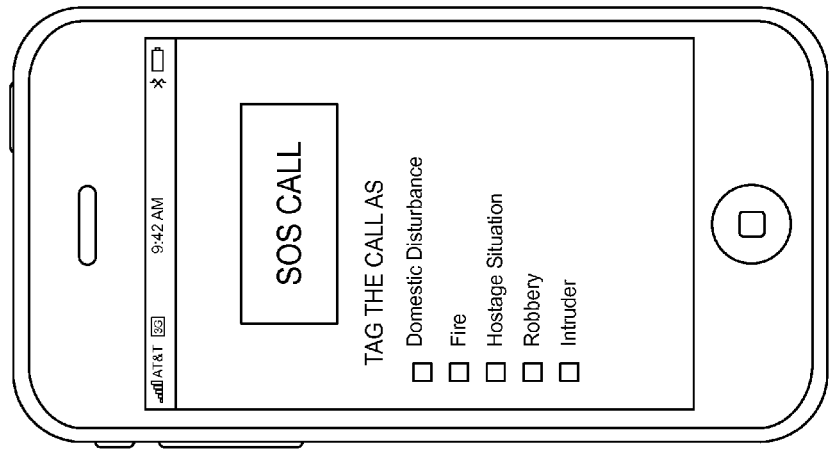
FIG. 17 shows an exemplary screen for a Sender tagging an emergency call.

For an emergency call or Upstream, ZAPAPP allows the user to "tag" the call, as mentioned above, to identify the type of situation the user is in. Tags can include Domestic Disturbance, Accident, Fire, Robbery, Intruder, Hostage Situation, Hazardous Material Spill, Terrorist Activity, General Crime Situation, etc. FIG. 17 shows an exemplary screen for tagging the call. As shown in FIG. 17, after clicking the SOS call, a list of tags is displayed; the user can choose the tag from this list.

ZAP Server software binds the components together. Typically this software is installed on servers that are owned and operated by ZAP, but third party operations, e.g., cloud servers, can also host ZAP SERVER.

Functions performed by ZAP SERVER can include listening for ZAPAPP Upstreams from Senders, which may include incoming distress calls from ZAPAPP, sending alerts to Safety Group members, sending alerts to Recipients within the Sender's Designated Recipient Groups for a particular Upstream, ZAPCLOUD WEBSITE hosting, "posting" the Upstream on the ZAPCLOUD WEBSITE, controlling the access to the Upstream on the ZAPCLOUD WEBSITE to the members of the Sender's Designated Recipient Group for the particular Upstream (or permitting access to all Recipients with ZAPAPP, if Sender has so directed for that particular Upstream), receiving incoming video, picture, text and/or audio data contained in the Upstream, streaming video, and for ZAP PROTECTED COUNTIES, receiving, and then forwarding to the applicable Dispatcher, video and other Information forwarded by Safety Group members, maintaining a database of all ZAPAPP Senders and Recipients, maintaining for each Sender, the database of Designated Recipient Groups and the members of those groups, and keeping logs of all Upstreams.

The ZAP SERVER also processes requests by Recipients for access to the ZAPCLOUD WEBSITE, including members of Designated Recipient Groups who have been invited to access particular Upstreams, other Recipients who want to access Upstreams that Senders have selected to be available to all Recipients with the ZAPAPP, and processing of searches for content on the ZAPCLOUD WEBSITE initiated by Recipients. The ZAP SERVER can manage the processing and display of advertising on the ZAPCLOUD WEBSITE, and can maintain the database and content of advertising and the protocols and instructions for inserting such advertising into displays on the ZAPCLOUD WEBSITE and the collection of data regarding viewing and responses to such advertising. These features are described in more detail below.

ZAP SERVER, e.g., Server, listens for Upstreams from Senders having the ZAPAPP, which may include incoming distress signals or alerts. ZAPAPP can send an Upstream, to the Server containing the Sender's video imagery and other Information which the Sender wants to display on the ZAPCLOUD WEBSITE. This Upstream may include signal, e.g., an alert, to the ZAP SERVER when a distress call originates from a mobile device running ZAPAPP. ZAP SERVER listens on a pre-designed port on the Server (say port Number

35678 as an example). ZAPAPP can send an Upstream, i.e. an alert, to that port (port 35678 in this example). An alert is sent to the Server by the ZAPAPP by sending certain information in a certain format to the port. For example, the format can be XML, JSON, or TEXT format. The information may or may not be encrypted based on the security convention followed. This communication, e.g., sending an alert, can be simple HTTP based or via a Socket Call.

The Upstream, i.e. alert, sent by ZAPAPP to ZAP SERVER can contain the login id of the Sender to identify the caller, and the geo-location co-ordinates of the Sender. Additional information can also be included. As soon as the ZAP SERVER gets this information, it creates a folder on the storage for storing the video, audio and/or text chat files and sends that folder information, e.g., folder identification or storage location for the information for this Upstream, back to ZAPAPP. This creates a session between ZAPAPP and ZAP SERVER. The ZAP SERVER then expects video files to be uploaded against this incident. The folder created on the storage by the ZAP SERVER provides the storage location, which is also recorded in the database, to set up a pointer between the Upstream and its storage location.

Figure 18:
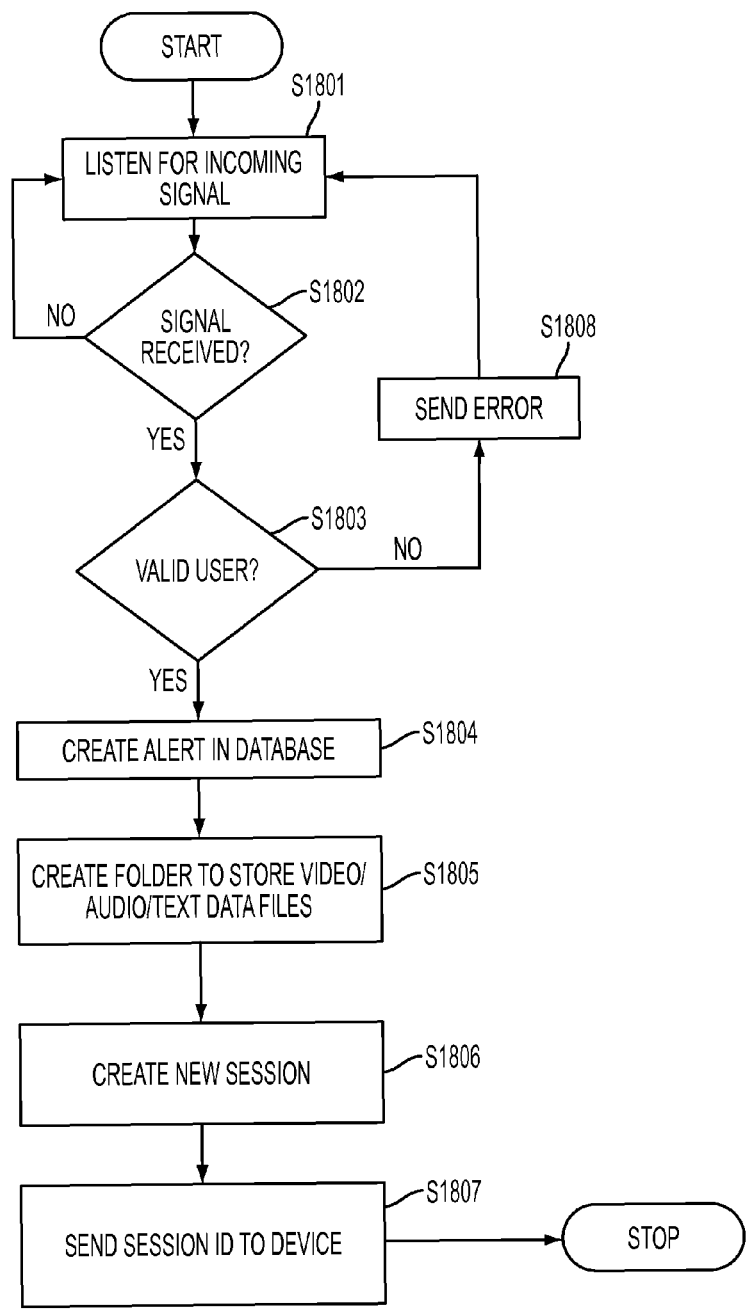
FIG. 18 is a flow diagram of listening for incoming Upstream actions from Senders calls.

FIG. 18 is a flow diagram of listening for Upstream actions from Sender calls. In step S1801, the server listens for an incoming signal. If a signal is received (S1802=YES) and if the user is valid (S1803=YES), then at step S1804, create an alert in the database. At step S1805, create a folder to store video/audio/text data, etc., files for this alert. At step S1806, start a new session. At step S1807, send the session id to the device from which the incoming signal was received.

If there is no incoming signal (S1802=NO), then continue listening at step S1801. If there is an incoming signal (S1802=YES) but the user is not valid (S1803=NO), then produce an error message at step S1808 and continue processing at S1801.

As soon as the server begins receiving video files, typically via FTP, RTP, RTSP, RTMP, HTTP or secure versions of these protocols or any other protocols available to ZAP for transferring files over the internet or 3G, 4G or other cellular networks, the server uploads and posts the Upstream content on the ZAPCLOUD WEBSITE and controls access to such Upstream content in accordance with the selections made by the Sender. The server sends alerts to the members of the Sender's Designated Recipient Group for that Upstream, and if it is an emergency call, the server sends an alert to all the members in the Safety group of the calling user. The Designated Recipient Group members and Safety group members are stored in the database at the ZAP Server and determined based on the Sender's login.

The information, e.g., data in the form of video, pictures, audio and/or text, that is received on the ZAP SERVER from ZAPAPP, is stored on the ZAP SERVER for log purposes. The Sender may specify for each particular Upstream how long the content thereof is to be displayed on the ZAPCLOUD WEBSITE. For example, a Sender who conducts an Upstream because he is walking through an unsafe area, the content of which is sent to the Sender's Safety Group, may specify that if no emergency situation actually arises, the content is to be deleted from the ZAPCLOUD WEBSITE after a specific amount of time. The ZAP SERVER may store the Information for longer periods of time, but eventually it will be deleted unless there has been an emergency incident. So long as the emergency Information is stored on the ZAP SERVER, it can be made available to dispatchers and law enforcement agencies. In other words, when the mobile device or personal computer of the Sender who is conducting the Upstream starts to stream video, pictures, audio and/or text, or when the Sender talks into his mobile device which can act as a phone, or types text into his device as part of the Upstream, this Information is sent to the server and stored for a length of time in accordance with the ZAP SERVER protocols.

When the ZAP SERVER receives an Upstream from a Sender, the ZAP SERVER processes the display of the Upstream on the ZAPCLOUD WEBSITE in accordance with the selections made by the Sender. If the Sender has selected that the access to the Upstream on the ZAPCLOUD WEBSITE is limited to the members of one or more of the Sender's Designated User Groups, the ZAP SERVER sends an alert to such members and limits access to the Upstream to such members. If the Sender has selected that access to the Upstream on the ZAPCLOUD WEBSITE is available to the general public, that is, all Recipients that have the ZAPAPP, then the ZAP SERVER enables access to the Upstream to all such Recipients, and the ZAP SERVER sends an alert to all Recipients who have requested an alert when a new Upstream is provided by that particular Sender. This is useful, for example, when Recipients in the general public who have ZAPAPP want to view Upstreams from a particular Sender who has a ZAPCHANNEL associated with that Sender.

Figure 19:
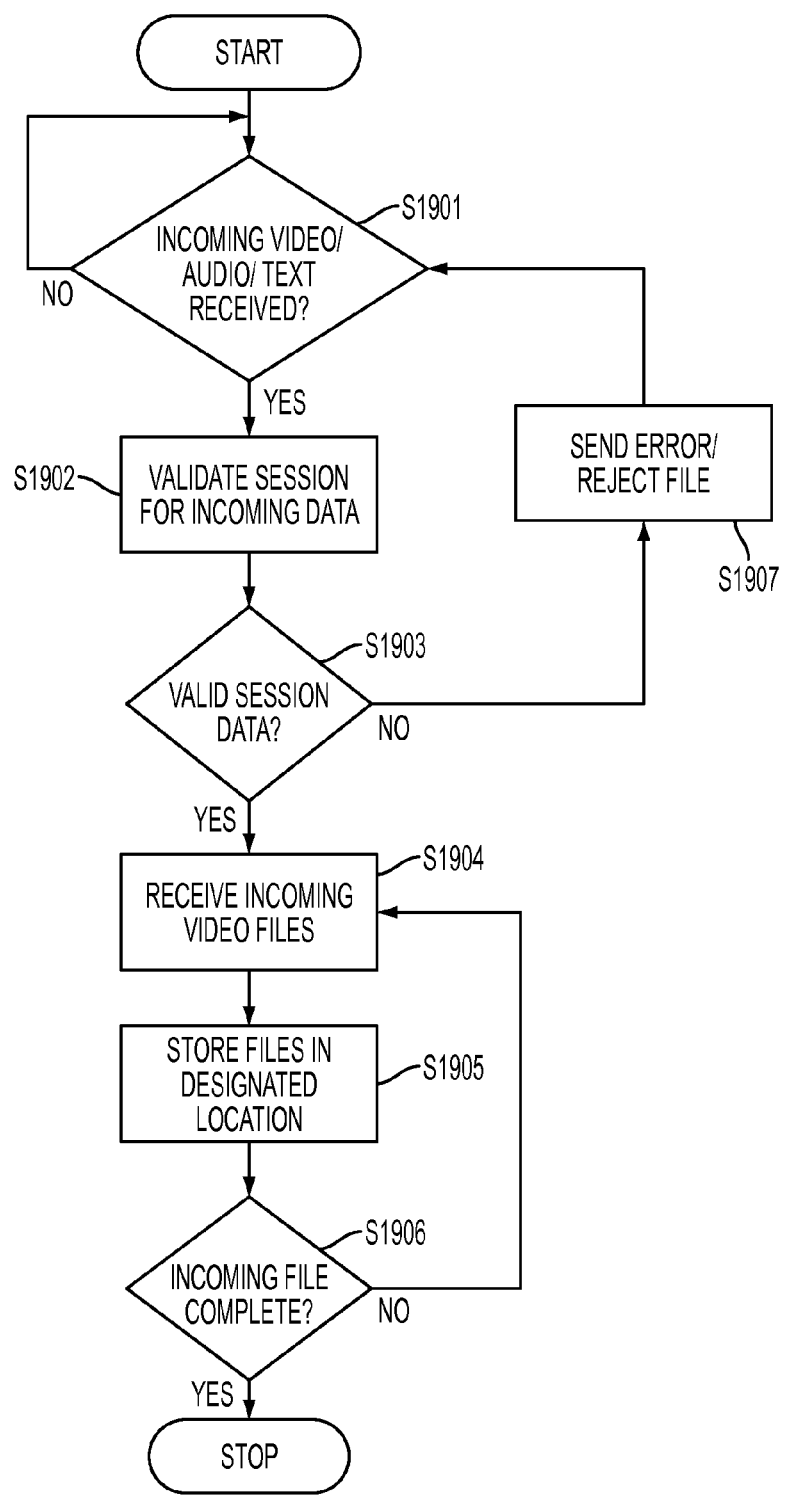
FIG. 19 is a flow diagram of ZAP SERVER receiving incoming information.

FIG. 19 is a flow diagram of ZAP SERVER receiving incoming video, picture, text and audio data on an incident. If an incoming video and/or audio and/or text is received at ZAP SERVER (S1901=YES), then at step S1902, the session for incoming data is validated. If it is a valid session (S1903=YES), then the incoming files are received in step S1904. The files are stored in the designed location in step S1905. If the incoming file is complete (S1906=YES), then processing stops. Otherwise (S1906=NO), processing continues at S1904.

If the data session is not valid (S1903=NO), then an error message is sent and the file and/or incoming information is rejected in step S1908. Processing continues at step S1901.

Figure 20:
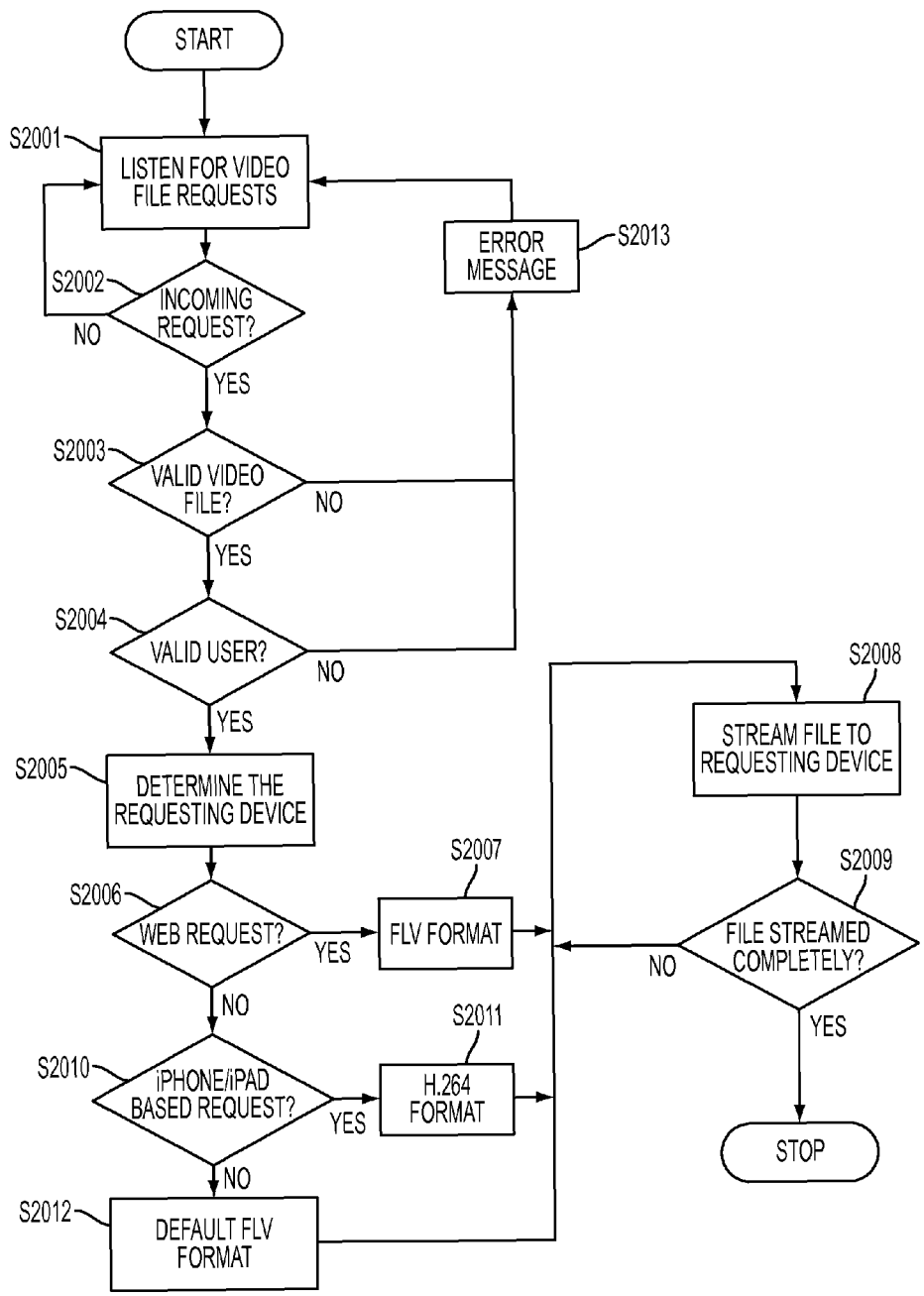
FIG. 20 is a flow diagram of how the audio, text and picture data is sent by ZAP SERVER to the ZAPCLOUD WEBSITE.

If no incoming information is received (S1901=NO), processing continues at step S1901. ZAP SERVER can stream video from the server to the APCLOUD WEBSITE, where it can be accessed in accordance with the selections made by the Sender for that particular Upstream, that is, members of one or more of the Sender's Designated Recipient Groups, or by the general public (i.e. all Recipients who have the ZAPAPP). In addition, the ZAP SERVER can stream video from the Server to the members of the Sender's Safety Group FIG. 20 is a flow diagram of how the information, such as audio, text and picture data, is sent by ZAP SERVER to the ZAPCLOUD WEBSITE and access to such Upstreamed content is limited in accordance with the selections made by the Sender for that particular Upstream. As shown in FIG. 20, in step S2001, listen for incoming information such as audio, text or picture data. When data is received (S2002=YES), then the Server evaluates if the incoming request is for a valid incident and from a valid user. If the incident is valid (S2003=YES) and the user is valid (S2004=YES), then determine the requesting device at step S2005.

If the request is a web request (S2006=YES), then the FLV format is chosen for video transmission in step S2007. The file is streamed to the requesting device in step S2008. If the file is completely streamed (S2009=YES), then the process stops. If the file is not completely streamed (S2009=NO), then processing continues at step S2008.

If the request is not a web request (S2006=NO), then if the request is an iPhone and/or iPad based request (S2010=YES), the H.264 format is chosen in step S2011. Processing continues at step S2008.

If the request is not a web request (S2006=NO) and not an iPhone/iPad based request (S2010=NO), then the default FLV format is chosen in step S2012. Processing continues at step S2008.

Figure 21B:
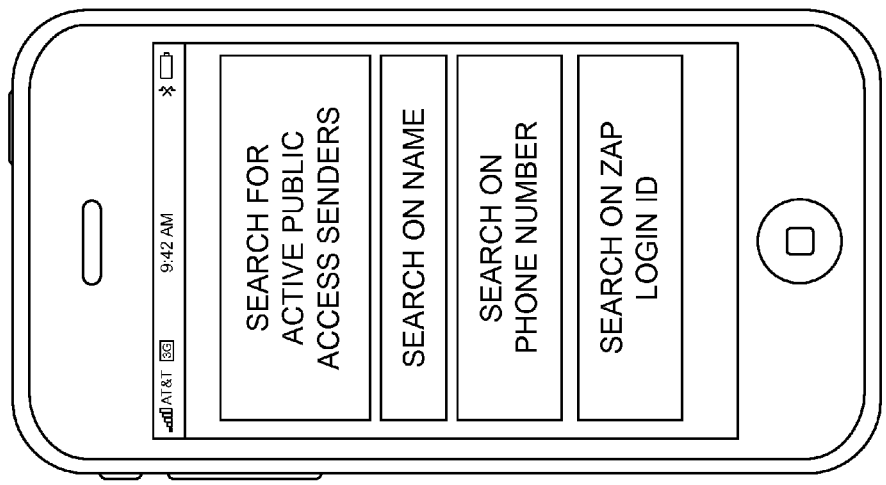
FIG. 21B is an exemplary screen of a Recipient searching for Public Access Senders.
Figure 21A:
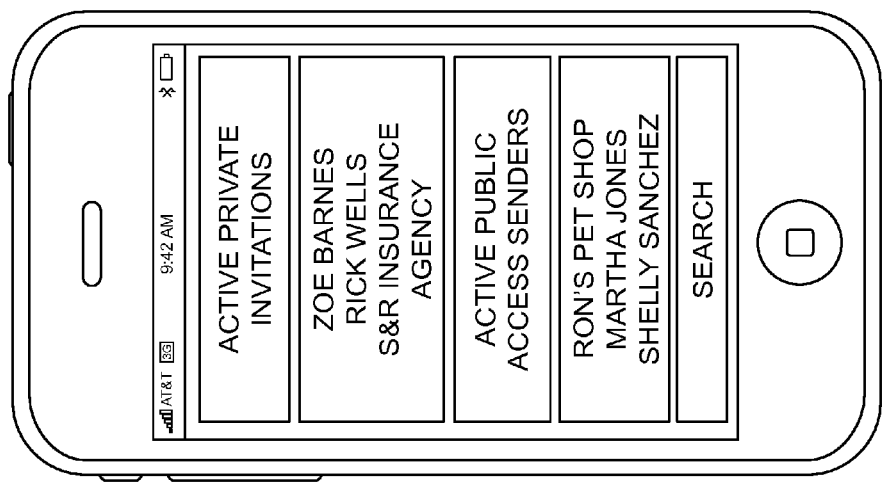
FIG. 21A is an exemplary screen of a Recipient showing Senders that are currently inviting the Recipient to access Upstreams.

FIGS. 21A and 21B are exemplary screens of a Recipient enabling access on the ZAPCLOUD WEBSITE to an Upstream for which he or she has been invited as a member of a Designated Recipient Group, as well as enabling searches on the ZAPCLOUD WEBSITE for Upstreams available to all Recipients having ZAPAPP. FIG. 21A illustrates a screen that shows the Recipient all Senders that are currently inviting this Recipient to access Upstreams because he or she is a member of their Designated Recipient Groups for those Upstreams, and the Recipient can click on such Sender identifications and obtain immediate access to their Upstreams on the ZAPCLOUD WEBSITE. The ZAP SERVER maintains a database of such information. FIG. 21B illustrates a screen that enables the Recipient to utilize a search engine in the ZAP SERVER so that the Recipient can access particular ZAPCHANNELS or Upstreams by Senders that have selected to make available content to all Recipients with ZAPAPP. If the Recipient searches and finds the ZAPCHANNEL or Upstream of interest, the Recipient can click on such Sender identification and obtain immediate access to the Upstream on the ZAPCLOUD WEBSITE.

Figure 22:
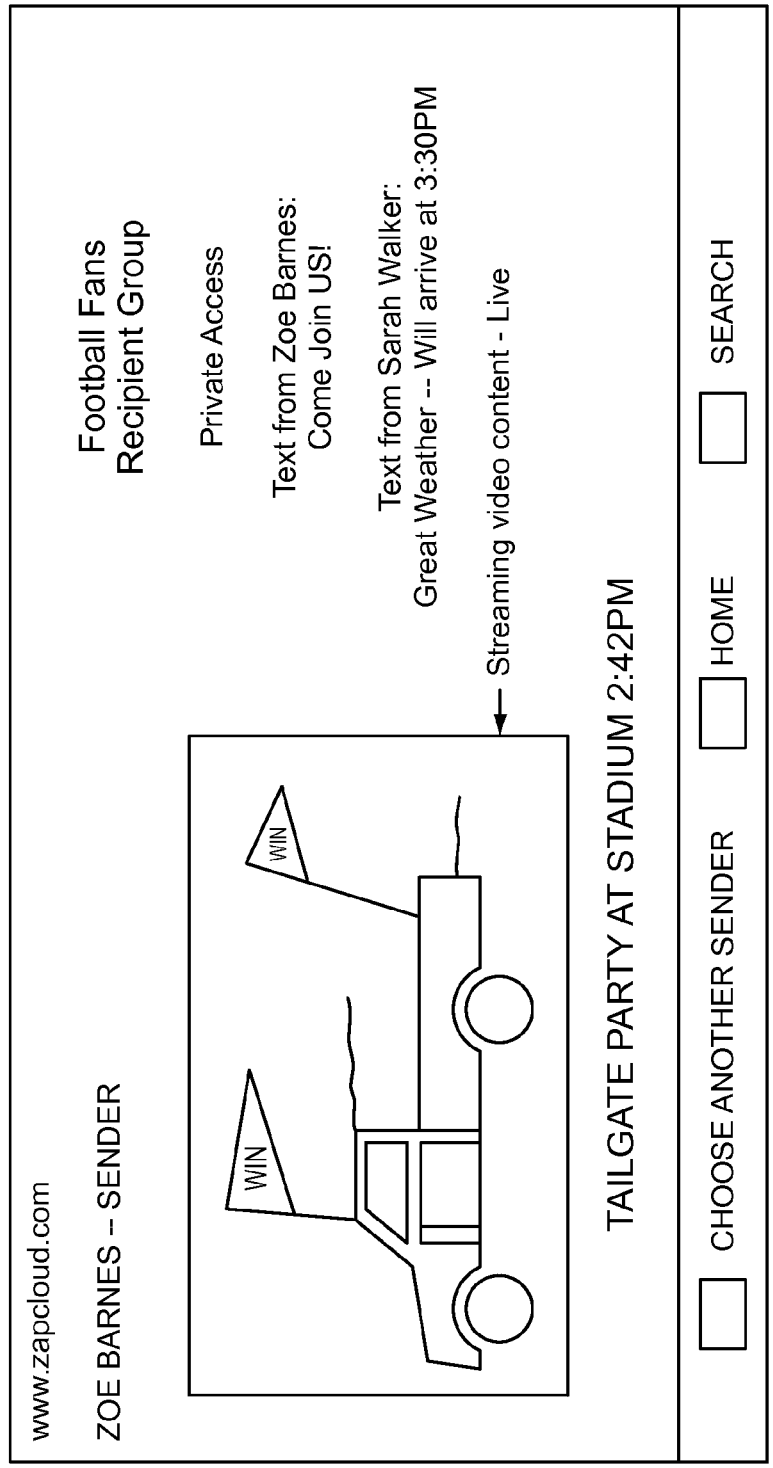
FIG. 22 is an exemplary screen of a Recipient utilizing the ZAPCLOUD WEBSITE to communicate with the Sender in response to video and other Information Upstreamed by an individual Sender.

The system enables Recipients to take actions in response to Upstreams for which they have access on the ZAPCLOUD WEBSITE. The Recipient may communicate with the Sender by text, for example, making comments such as "Can you give an explanation of the charts you are using?" or "I see you are having fun at your party sorry I can't get there in person" or "Call me when you can". FIG. 22 is an exemplary screen of a Recipient utilizing the ZAPCLOUD WEBSITE to communicate with the Sender in response to video and other Information Upstreamed by an individual sender. The Recipient may also conduct electronic commerce in response to video and other Information Upstreamed by a commercial Sender. In this embodiment, the Upstream of the Sender would most likely be a ZAPCHANNEL associated with that Sender which would either have link to the Sender's commercial website, or would directly on the ZAPCHANNEL, enable the Recipient to make purchases or conduct other electronic commerce.

Figure 23:
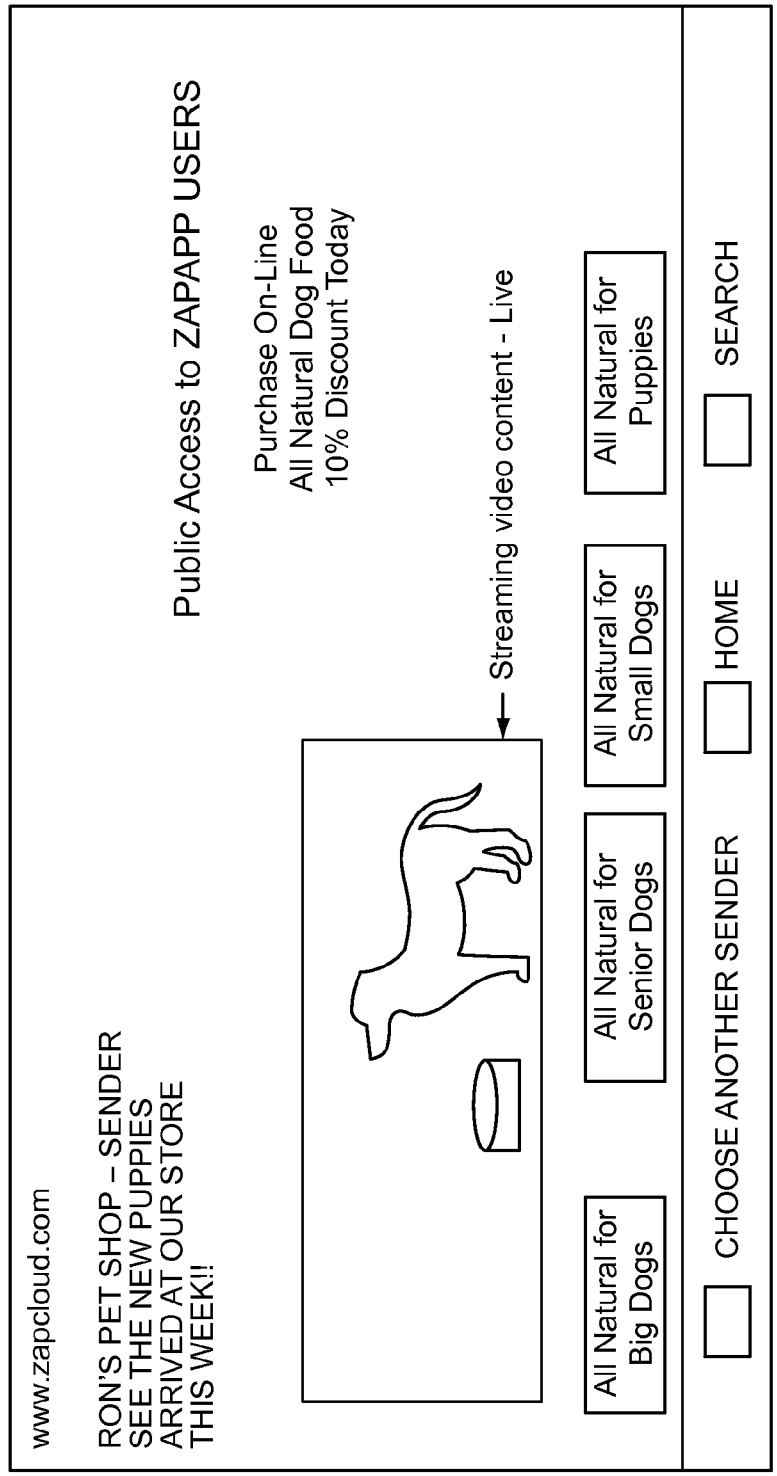
FIG. 23 is an exemplary screen of a Recipient utilizing the ZAPCLOUD WEBSITE to conduct electronic commerce in response to video and other Information Upstreamed by a commercial Sender.

FIG. 23 is an exemplary screen of a Recipient utilizing the ZAPCLOUD WEBSITE to conduct electronic commerce in response to video and other information Upstreamed by a commercial Sender.

As discussed above, the Sender may select his or her Safety Group members to receive an Upstream, when the Sender is in an unsecure situation and wants his or her Safety Group members to monitor the video being Upstreamed by the Sender's mobile device. The ZAP SERVER will alert the Safety Group members and directly forward the Upstream of video content to the Safety Group members. In a ZAP PROTECTED COUNTY, the Safety Group members receiving the video content on their mobile devices or personal computers, can forward such video content to a Dispatcher. FIG. 8B is, as discussed above, an exemplary screen of a Dispatcher in a ZAP PROTECTED COUNTY when a Safety Group member has forwarded video imagery or other Information from a Sender. The Dispatcher in a ZAP PROTECTED COUNTY receiving such video imagery or other Information from a Sender can forward such information to First Responders via the ZAP Server. The ZAP Dispatch and Zap First Responder Software are part of the ZAP911 System described in detail in U.S. application Ser. No. (28235).

As discussed above, ZAP SERVER maintains a database including at least all registered Senders and Recipients who have ZAPAPP, each Sender's portfolio of Designated Recipient Groups and the members of each of such Designated Recipient Groups, each Recipient's list of Senders and ZAPCHANNELS for which he or she desires an alert of a new Upstream and identification of all Upstreams and the Sender's selections of access to each such Upstream. The ZAP SERVER will also maintain in its database all transmissions of Upstreams to a Sender's Safety Group and, in a ZAP PROTECTED COUNTY, any forwarding by Safety Group members of such content to a Dispatcher. The ZAP SERVER will maintain timestamps on these elements. Other elements can also be included in this database. This information can be stored on a computer storage device, such as a hard drive, and can be managed using a relational database (RDBMS) system.

All information, including visual, picture (image), audio and text content of an Upstream is stored on the Server for a fixed period of time.

Figure 24:
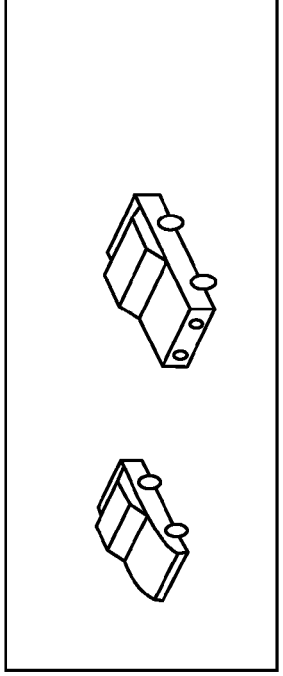
FIG. 24 is an exemplary screen of a ZAPCHANNEL featuring video and other information and advertisements, and enabling the recipient to respond electronically.

The system enables Senders to create a ZAPCHANNEL, which is a more permanent presence on the ZAPCLOUD WEBSITE associated with a particular Sender. A ZAPCHANNEL is somewhat like a channel on broadcast or cable television, where a Sender may Upstream video, audio, text and data Information from time to time, which may include advertising, publicity or other content. The Sender can have one or more ZAPCHANNELS. For each ZAPCHANNEL, the Sender can select whether access on the ZAPCLOUD WEBSITE for that ZAPCHANNEL is limited to members of one or more Designated Recipient Groups of the Sender, or whether all Recipients who have a ZAPAPP can access the ZAPCHANNEL. For example, a pet store or pet adoption agency might have a ZAPCHANNEL with live video Upstreams of the latest arrivals of pets for sale or adoption, along with other displays of information, such as directions, store hours, contact information, and other advertisements. An automobile dealership might have a ZAPCHANNEL with live or archived video Upstreams of the latest arrivals of new cars and trucks, along with other displays of information, such as special sale or lease offers, vehicle features and performance and other advertisements. FIG. 24 is an exemplary screen of a ZAPCHANNEL of an automobile dealership featuring video imagery and other information and advertisements.

Figure 25:
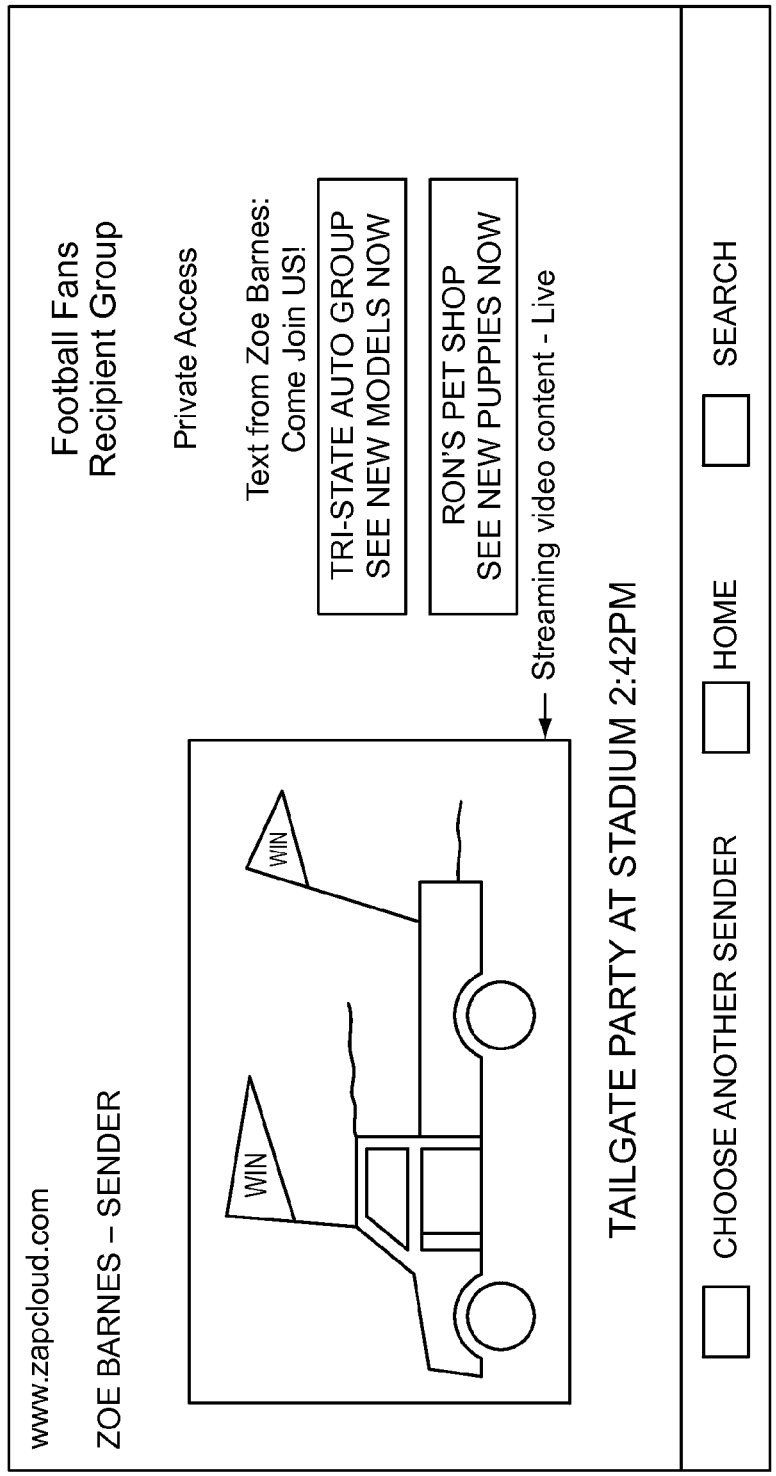
FIG. 25 is an exemplary screen of a Recipient viewing a Sender's Upstream with advertising from a third party not associated with that Sender.

The system can also serve as an advertising and publicity medium. When Recipients access the ZAPCLOUD WEBSITE, they can see advertising, publicity, and notifications, which might be associated with the particular Sender whose Upstream they are viewing, or which might be third party advertising not associated with that Sender. FIG. 25 is an exemplary screen of a Recipient viewing a Sender's Upstream with advertising from third parties, e.g., Tri-State Auto Group and Ron's Pet Shop, not associated with that Sender. The ZAP Server will manage the processing and display of advertising on the ZAPCLOUD WEBSITE.

The novel system can operate with the following protocols: SOCKETS, HTTP Uploads, RTP, RTSP, RTMP, and/or MQTT. Other protocols for communication, transfer and receipt of data may also be used. Methods of transmission of information in the inventive system can include FTP, Messaging, Secure Sockets, Secure HTTP, Secure FTP, Secure Messaging server protocols, Secure RTP, Secure RTSP, and/or Secure RTMP.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc. The system also may be implemented on a virtual computer system, colloquially known as a cloud.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud). A module may be a component of a device, software, program, or system that implements some "functionality", which can be embodied as software, hardware, firmware, electronic circuitry, or etc.

The terms "click" and "click on" as may be used in the present application may include a variety of techniques for input, such as touching the screen, pressing with a stylus device, announcing voice command and other known methods.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system for real time video streaming from a device through a website, comprising:
   a server having a CPU, the server operable to bi-directionally communicate with a sender device and with one or more recipient devices, the sender device and the one or more recipient devices having an application operable to bi-directionally communicate with the server, the bi-directional communication comprising real time video being streamed at the same time as the video is being captured by the sender device;
   a module on the server operable to:
   receive notice of an upstream comprising streaming real time video from the sender device, the notice being synchronized with the start of the video capture,
   authenticate a log-in of the sender device,
   transmit the upstream to a website,
   transmit the notice of the upstream to one or more pre-selected recipients, the pre-selected recipients comprising: one or more Designated Recipient Groups selected in accordance with the log-in of the sender device, and pre-determined recipients in accordance with the log-in of the sender device,
   display the upstream on the website,
   stream the real time video to the recipient device associated with each of the one or more pre-selected recipients at the same time as the video is being captured in response to a request from the one or more pre-selected recipients, and
   route responses from the pre-selected recipient to the website and display the responses on the displayed upstream.

2. The system according to claim 1, wherein the module is further operable to route bi-directional communication between the sender device and the one or more recipient devices and record, at the server, the bi-directional communication between the sender device to the one or more recipient devices.

3. The system according to claim 1, wherein the sender device is a mobile device having characteristics comprising at least a geographic location and the server further operable to prepare and maintain a map of the geographic location of the sender device.

4. The system according to claim 1, wherein the bi-communication between the server and the sender device is performed using one or more of an internet and a cellular network, the bi-communication between the server and the one or more recipient devices is performed using one or more of an internet and a cellular network.

5. The system according to claim 1, wherein the bi-directional communication comprises one or more of live audio, images, text, data in encrypted form and data in unencrypted form.

6. The system according to claim 1, wherein the server is further operable to place information into the displayed upstream on the website in real time at the same time as the video is being captured, the information comprising at least one of advertising, publicity, emergency, security, traffic, weather, educational and entertainment information.

7. The system according to claim 1, wherein the one or more recipient devices comprise one or more of a mobile device, a personal computer, a laptop, a tablet and an interne television, and at least one of the one or more recipient devices and a log-in of one of the one or more recipient devices is registered with the system.

8. The system according to claim 1, the module further operable to:
manage data describing the log-in of the sender device, the data comprising one or more of name, address and emergency contacts of a particular sender associated with the sender device, and pre-selected recipient names and telephone numbers.

9. The system according to claim 1, wherein the responses to the displayed content comprise at least communicating with the log-in of the device, posting comments, conducting electronic commerce, making appointments and making reservations.

10. The system according to claim 1, further including a real time streaming video channel associated with a particular sender which contains live video imagery and other information uploaded by the particular sender to the website and which can be accessed by the one or more pre-selected recipients or by the general public on the website.

11. The system according to claim 10, wherein the video channel includes the ability of the pre-selected recipients or general public to take actions on the website in response to the information on the video channel, the actions comprising conducting electronic commerce transactions, making appointments, making reservations, entering text and data.

12. The system according to claim 11, wherein the module is further operable to enable searching for video imagery, audio, text and data on the website with respect to particular channels and particular senders.

13. The system according to claim 3, wherein the module is further operable to determine the geo-location of the sender device, send an alert to a dispatcher nearest to the geo-location of the sender device and stream the real time video to the nearest dispatcher.

14. The system according to claim 13, wherein the module is further operable to forward the real time video from the dispatcher to responders selected by the dispatcher based on the geo-location of the sender device.

15. The system according to claim 13, wherein the module is further operable to send an alert to one or more pre-selected recipients, stream the real time video to the one or more pre-selected recipients and forward the real time video from the one or more pre-selected recipients to the nearest dispatcher based on the geo-location of the sender device.

16. The system according to claim 1, wherein the module is further operable to obtain a login ID and geo-location of the sender device, create a folder for storing the upstream and sends folder identifying information back to the sender device thereby creating a video session between the sender device and the server.

17. The system according to claim 16, wherein the module is further operable to store the upstream, including one or more of video, audio, text and data files in the folder relating to the video session.

18. The system according to claim 17, wherein the module is further operable to store in the folder one or more of video, audio, text and data files of bi-directional communications related to the video session.

19. A method for real time video streaming from a device through a website, comprising steps of:
receiving notice of an upstream comprising streaming real time video from a sender device, the video being streamed at the same time as the video is being captured by the sender device, the notice being synchronized with the start of the video capture;
authenticating a log-in of the sender device;
transmitting the notice of the upstream to one or more pre-selected recipients, the pre-selected recipients comprising:
one or more designated recipient groups selected in accordance with the log-in of the sender device, and pre-determined recipients in accordance with the log-in of the sender device;
transmitting the upstream to a website;
displaying the upstream on the website,
streaming the real time video to a recipient device associated with each of the one or more pre-selected recipients at the same time as the video is being captured in response to a request from the one or more pre-selected recipients; and
routing responses from the pre-selected recipient to the website and display the responses on the displayed upstream.

20. The method according to claim 19, further comprising steps of:
routing bi-directional communication between the sender device and the one ore more recipient devices; and
recording, at the server, the bi-directional communication between the sender device to the one or more recipient devices.

21. The method according to claim 19, further comprising a step of preparing and maintaining a map of a geographic location of the sender device.

22. The method according to claim 20, wherein the step of bi-directionally communicating between the server and the sender device is performed using one or more of an internet and a cellular network and the step of bi-directionally communication between the server and the one or more recipient devices is performed using one or more of an internet and a cellular network.

23. The method according to claim 20, wherein bi-directionally communicating is performed using one or more of live audio, images, text, data in encrypted form and data in unencrypted form.

24. The method according to claim 19, further including placing information into the displayed upstream on the website in real time at the same time as the video is being captured, the information comprising at least one of advertising, publicity, emergency, security, traffic, weather, educational and entertainment information.

25. The method according to claim 19, further comprising a step of registering at least one of the one or more recipient devices and a log-in of one of the one or more recipient devices, wherein the recipient devices comprise one or more of a mobile device, a personal computer, a laptop, a tablet and an internet television.

26. The method according to claim 19, further comprising steps of:
managing data describing the log-in of the sender device, the data comprising one or more of name, address and emergency contacts of a particular sender associated with the sender device, and pre-selected recipient names and telephone numbers.

27. The method according to claim 19, wherein the responses to the displayed content comprise at least communicating with the log-in of the device, posting comments, conducting electronic commerce, making appointments and making reservations.
managing data describing the log-in of the sender device, the data comprising one or more of name, address and emergency contacts of a particular sender associated with the sender device, and pre-selected recipient, names and telephone numbers 28. A non-transitory computer readable storage medium storing a program of instructions executable by a machine to perform a method for real time video streaming from a device through a website, comprising:
- receiving notice of an upstream comprising streaming real time video from a sender device, the video being streamed at the same time as the video is being captured by the sender device, the notice being synchronized with the start of the video capture;
- authenticating a log-in of the sender device;
- transmitting the notice of the upstream to one or more pre-selected recipients, the pre-selected recipients comprising:
  - one or more designated recipient groups selected in accordance with the log-in of the sender device, and
  - pre-determined recipients in accordance with the log-in of the sender device;
- transmitting the upstream to a website;
- displaying the upstream on the website,
- streaming the real time video to a recipient device associated with each of the one or more pre-selected recipients at the same time as the video is being captured in response to a request from the one or more pre-selected recipients; and
- routing responses from the pre-selected recipient to the website and display the responses on the displayed upstream.

29. The non-transitory computer readable storage medium according to claim 28, further comprising steps of:
- routing bi-directional communication between the sender device and the one or more recipient devices; and
- recording, at the server, the bi-directional communication between the sender device to the one or more recipient devices.

30. The non-transitory computer readable storage medium according to claim 28, further comprising a step of preparing and maintaining a map of a geographic location of the sender device.

31. The non-transitory computer readable storage medium according to claim 29, wherein the step of bi-directionally communicating between the server and the sender device is performed using one or more of an internet and a cellular network and the step of bi-directionally communication between the server and the one or more recipient devices is performed using one or more of an internet and a cellular network.

32. The non-transitory computer readable storage medium according to claim 29, wherein bi-directionally communicating is performed using one or more of live audio, images, text, data in encrypted form and data in unencrypted form.

33. The non-transitory computer readable storage medium according to claim 28, further including placing information into the displayed upstream on the website in real time at the same time as the video is being captured, the information comprising at least one of advertising, publicity, emergency, security, traffic, weather, educational and entertainment information.

34. The non-transitory computer readable storage medium according to claim 28, further comprising a step of registering at least one of the one or more recipient devices and a log-in of one of the one or more recipient devices, wherein the recipient devices comprise one or more of a mobile device, a personal computer, a laptop, a tablet and an internet television.

35. The non-transitory computer readable storage medium according to claim 28, further comprising steps of:
- managing data describing the log-in of the sender device, the data comprising one or more of name, address and emergency contacts of a particular sender associated with the sender device, and pre-selected recipient, names and telephone numbers.

36. The non-transitory computer readable storage medium according to claim 28, wherein the responses to the displayed content comprise at least communicating with the log-in of the device, posting comments, conducting electronic commerce, making appointments and making reservations.

* * * * *